US011334012B2

(12) United States Patent
Nonoyama et al.

(10) Patent No.: US 11,334,012 B2
(45) Date of Patent: May 17, 2022

(54) IMAGE FORMATION APPARATUS AND CONTROL METHOD THEREFOR

(71) Applicant: Konica Minolta Inc., Tokyo (JP)

(72) Inventors: Masahiro Nonoyama, Toyokawa (JP); Masahiro Kamiya, Toyohashi (JP); Katsuhide Sakai, Toyokawa (JP); Junichi Masuda, Toyokawa (JP); Taku Kimura, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/337,054

(22) Filed: Jun. 2, 2021

(65) Prior Publication Data

US 2021/0405565 A1 Dec. 30, 2021

(30) Foreign Application Priority Data

Jun. 26, 2020 (JP) .............................. JP2020-110301

(51) Int. Cl.
G03G 15/00 (2006.01)

(52) U.S. Cl.
CPC .................................. G03G 15/5029 (2013.01)

(58) Field of Classification Search
CPC ........... G03G 15/5029; G03G 15/6594; H04N 1/00724; H04N 1/00779; H04N 1/00716; H04N 2201/0094
See application file for complete search history.

(56) References Cited

U.S. PATENT DOCUMENTS

| 2013/0201502 | A1* | 8/2013 | Rajendraprasad .......................... H04N 1/00323 358/1.13 |
| 2019/0171149 | A1 | 6/2019 | Tsujimoto et al. |
| 2020/0159153 | A1 | 5/2020 | Takemasa |

FOREIGN PATENT DOCUMENTS

| JP | 2017-211634 A | 11/2017 |
| JP | 2018-1572 A | 1/2018 |
| JP | 2018-10056 A | 1/2018 |

OTHER PUBLICATIONS

Extended European Search Report (EESR) dated Sep. 29, 2021 issued in corresponding European Patent Application No. 21180062.8.

* cited by examiner

Primary Examiner — Susan S Lee
(74) Attorney, Agent, or Firm — Rankin, Hill & Clark LLP

(57) ABSTRACT

An image formation apparatus includes: an image former that forms an image on a recording medium delivered along a predetermined delivery path and outputs the recording medium; a first hardware processor that judges whether or not the recording medium is an envelope; a second hardware processor that acquires a basis weight of the recording medium; a third hardware processor that determines control for when an image is formed on the recording medium on the basis of a judgment result from the first hardware processor and a basis weight acquired by the second hardware processor; and a fourth hardware processor that controls operation of the image former on the basis of a determination result from the third hardware processor.

25 Claims, 13 Drawing Sheets

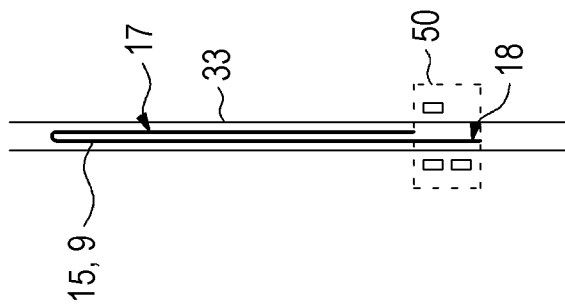
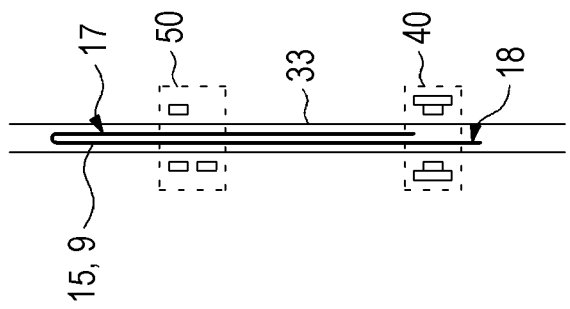
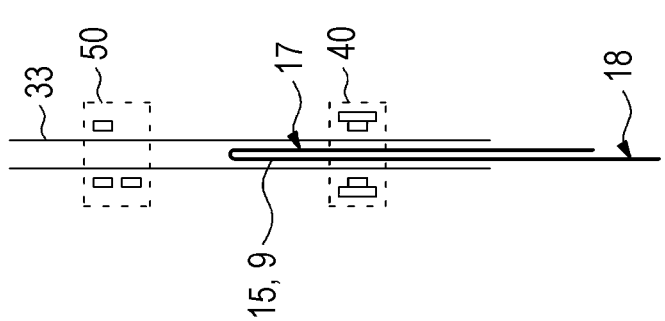
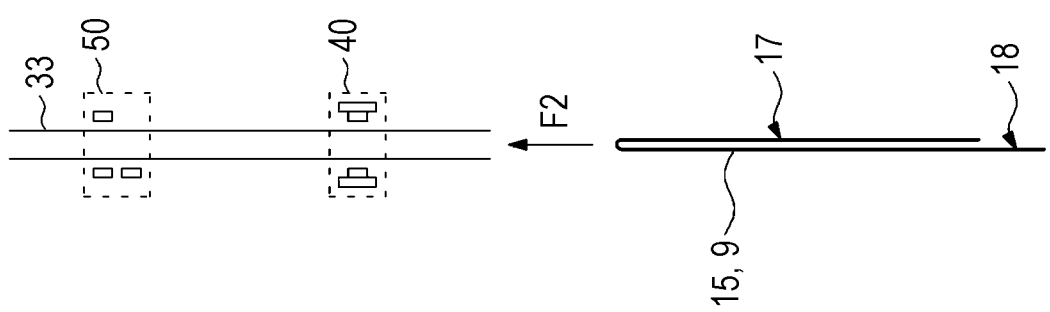

| RECORDING MEDIUM | | TYPE | SYSTEM VELOCITY (Vs) | FIXING ROLLER VELOCITY (Vt) | LOOP CONTROL | FIXING TEMPERATURE (T) | FIXING ROLLER PRESSURE CONTACT FORCE(FP) |
|---|---|---|---|---|---|---|---|
| SHEET | | PLAIN PAPER | FIRST VELOCITY (V1) (V1=200mm/s) | Vt=Vs | PERFORMED | FIRST TEMPERATURE (T1) (T1=170°C) | FIRST PRESSURE CONTACT FORCE (FP1) (NORMAL PRESSURE CONTACT FORCE) |
| | | THIN PAPER | FIRST VELOCITY (V1) (V1=200mm/s) | Vt=Vs | PERFORMED | SECOND TEMPERATURE (T2) (T2=150°C) | SECOND PRESSURE CONTACT FORCE(FP2) (FP2<FP1) |
| | | THICK PAPER | SECOND VELOCITY (V2) (V2=100mm/s) | Vt=Vs | PERFORMED | SECOND TEMPERATURE (T2) (T2=150°C) | THIRD PRESSURE CONTACT FORCE (FP3) (FP3>FP1) |
| ENVELOPE | | ENVELOPE (THIN) | FIRST VELOCITY (V1) (V1=200mm/s) | Vt>Vs (Vt=210mm/s) | NOT PERFORMED | T<T1 (T=165°C) | FP<FP1 |
| | | ENVELOPE (THICK) | SECOND VELOCITY (V2) (V2=100mm/s) | Vt=Vs | PERFORMED | T<T1 (T=160°C) | FP=FP1 |

FIG. 12A

G1 — SELECT RECORDING MEDIUM TYPE.

- B1: PLAIN PAPER
- B2: THIN PAPER
- B3: THICK PAPER
- B4: ENVELOPE

OK  CANCEL

FIG. 12B

G2 — INPUT BASIS WEIGHT OF ENVELOPE.

R1: [_____] g/m²

B5: 0 1 2 3 4 5 6 7 8 9 .

OK  CANCEL

FIG. 12C

G3 — SELECT ENVELOPE TYPE.

- B7
- B8
- B9
- B10

OK  CANCEL

IMAGE FORMATION APPARATUS AND CONTROL METHOD THEREFOR

The entire disclosure of Japanese patent Application No. 2020-110301, filed on Jun. 26, 2020, is incorporated herein by reference in its entirety.

BACKGROUND

Technological Field

The present invention relates to an image formation apparatus and a control method therefor, and, in particular, to a technique for forming an image suitable for an envelope when the envelope is a recording medium subjected to image formation.

Description of the Related Art

Conventionally, there is known an image formation apparatus such as a printer or a multifunction peripheral (M P) that measures thickness of a sheet of printing paper, or the like, and performs setting for the sheet on the basis of the measured thickness to form an image (For example, Japanese Patent Application Laid-Open No. 2018-10056). An image formation apparatus capable of forming an image on an envelope also conventionally known (for example, Japanese Patent Application Laid-Open No. 2017-211634).

In recent years, there are increasing types of envelopes used for being subjected to image formation in an image formation apparatus, and there are envelopes of various thicknesses depending on the types of the envelopes. In a case of being used as a recording medium subjected to image formation by an image formation apparatus, an envelope has a problem of being susceptible to wrinkling when passing a fuser, as compared with a sheet such as ordinary printing paper. Therefore, an image formation apparatus is formed to reduce wrinkling on an envelope as a recording medium subjected to image formation by performing control different from control performed when a sheet is subjected to the image formation.

However, in a case where a recording medium is an envelope, a conventional image formation apparatus uniformly applies a predetermined setting value for envelope to form an image That is, the conventional image formation apparatus applies the same setting value to form an image both when a thin envelope is used and when a thick envelope is used.

However, in general, a thin envelope is characterized by being more susceptible than a thick envelope to wrinkling when passing a fuser. Therefore, the conventional image formation apparatus has a problem that a thin envelope as a recording medium subjected to image formation may still be wrinkled, resulting in deterioration in quality of a printed material.

SUMMARY

The present invention has been made to solve the above-described problem, and an object of the present invention is to provide an image formation apparatus and a control method therefor that are capable of appropriately forming an image according to a type of an envelope.

To achieve the abovementioned object, according to an aspect of the present invention, an image formation apparatus reflecting one aspect of the present invention comprises: an image former that forms an image on a recording medium delivered along a predetermined delivery path and outputs the recording medium; a first hardware processor that judges whether or not the recording medium is an envelope; a second hardware processor that acquires a basis weight of the recording medium; a third hardware processor that determines control for when an image is formed on the recording medium on the basis of a judgment result from the first hardware processor and a basis weight acquired by the second hardware processor; and a fourth hardware processor that controls operation of the image former on the basis of a determination result from the third hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 7A to 7D are diagrams describing operation of the envelope detection sensor and the basis weight detection sensor;

FIG. 9 is a diagram showing an example of reference information;

FIGS. 12A to 12C are diagrams showing operation screens displayed in an operation panel.

DETAILED DESCRIPTION OF EMBODIMENTS

Hereinafter, one or more embodiments of the present invention will be described with reference to the drawings. However, the scope of the invention is not limited to the disclosed embodiments. In the embodiments described below, components common to each other are provided with the same reference signs, so that repeated description of these components is omitted.

First Embodiment

Figure 1:
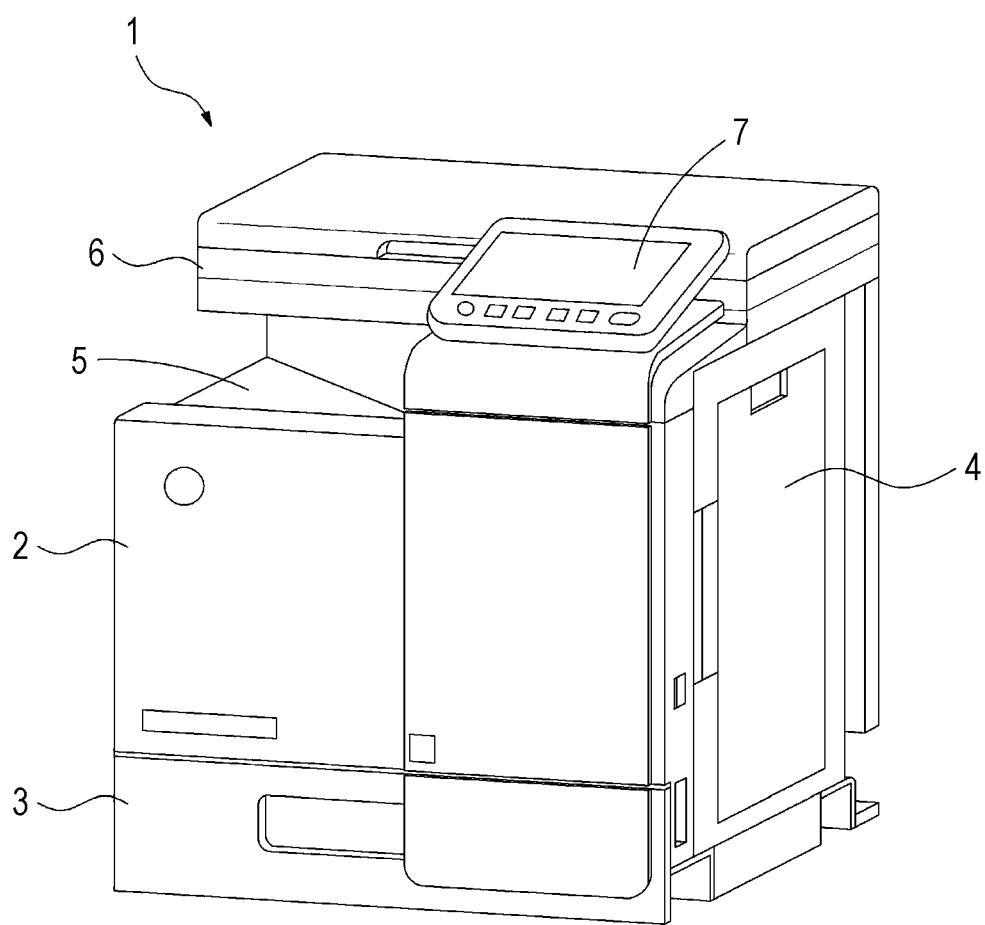
FIG. 1 is a diagram showing an example of an external configuration of an image formation apparatus.

FIG. 1 is a diagram showing an image formation apparatus 1 according to an embodiment of the present invention. The image formation apparatus 1 shown in FIG. 1 is formed as a multifunction peripheral (M P) including a plurality of functions such as a copy function, a scanning function, and a print function, for example. Focusing on the print function, the image formation apparatus 1 is a type of apparatus that forms an image with an electrophotographic system, and is an apparatus capable of forming a color image by a tandem system. The image formation apparatus 1 includes an image formation unit 2 in a central portion of a main body of the apparatus. A paper feed tray 3 provided below the image formation unit 2 can accommodate recording medium such as a sheet or an envelope in advance. The image formation unit 2 includes an openable and closable manual feed tray 4 on a side surface of the main body of the apparatus. The image formation apparatus 1 feeds a recording medium set in the paper feed tray 3 or on the manual feed tray 4 one by one, forms an image on the recording medium, and ejects the recording medium to a paper ejection tray 5 provided above.

The image formation apparatus 1 includes an image reading unit 6 in an upper part of the main body of the apparatus. The image reading unit 6 is for reading an image of a document in a case where, for example, the copy function or the scanning function is selected. That is, the image reading unit 6 optically reads a document set by a user to generate image data.

Further, the image formation apparatus 1 includes an operation panel 7 serving as a user interface on a front side of the main body of the apparatus. The image formation apparatus 1 displays various operation screens that can be operated by the user on the operation panel 7, and receives operation by the user.

Figure 2:
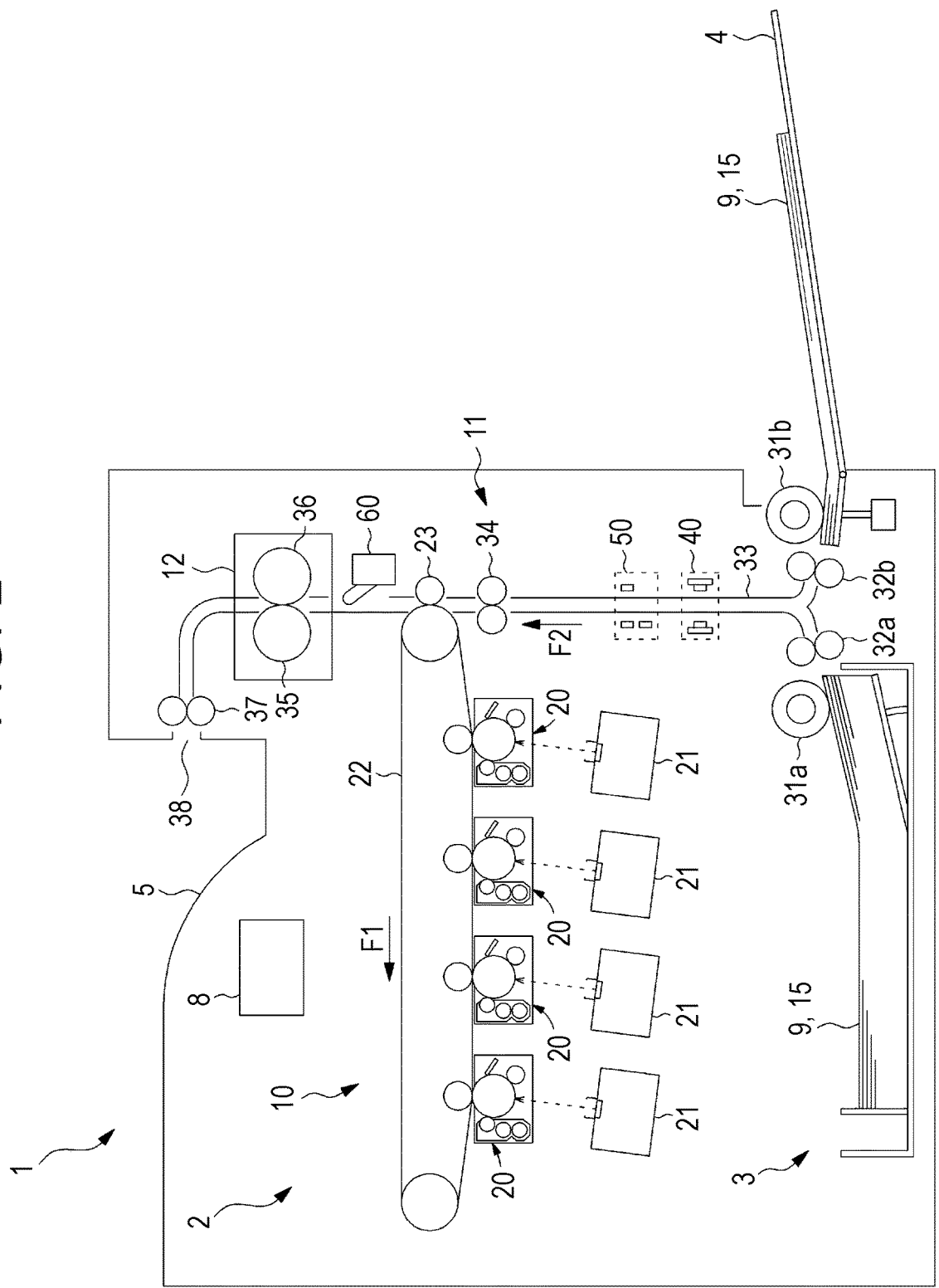
FIG. 2 is a diagram showing an example of an internal structure of an image formation unit.

FIG. 2 is a diagram showing an example of an internal structure of an image formation unit 2 in the image formation apparatus 1. FIG. 2 shows a state where the manual feed tray 4 is opened. As shown in FIG. 2, the paper feed tray 3 can accommodate a plurality of recording media 9. A plurality of recording media 9 can also be set on the manual feed tray 4. The image formation unit 2 is formed to deliver a recording medium 9 accommodated in the paper feed tray 3 or a recording medium 9 set on the manual feed tray 4, form an image on the recording medium 9 when the recording medium 9 passes a predetermined position, fix the image, and then eject the recording medium 9 to the paper ejection tray 5. As the recording medium 9, a sheet such as printing paper can be used. An envelope 15 can also be used as the recording medium 9.

The image formation apparatus 1 includes a controller 8 comprehensively controls image forming operation inside of the main body of the apparatus. The controller 8 control image forming operation on a recording medium 9 by controlling operation of each unit provided in the image formation unit 2.

The image formation unit 2 has an image forming unit 10 that forms an image and transfer the image onto a recording medium 9, a delivery mechanism 11 that delivers the recording medium 9, and a fixing unit 12 that fixes the image, which is transferred onto the recording medium 9, onto the recording medium 9.

The image forming unit 10 includes a plurality of toner image generation units 20 provided to generate a toner image of each of color components of yellow (Y), magenta (M), cyan (C), and black (K), a plurality of exposure units 21 to expose each of image carriers (photoreceptor drums) provided on the respective toner image generation units 20, an intermediate transfer belt 22 onto which toner images generated in the toner image generation units 20 are primarily transferred, and a secondary transfer roller 23 that secondarily transfers the toner images primarily transferred by the intermediate transfer belt 22 onto a recording medium 9.

The image forming unit 10 forms electrostatic latent images corresponding to the respective color components on the image carriers of the respective toner image generation units 20 by driving the plurality of toner image generation units 20 and the plurality of the exposure units 21 on the basis of image data to be printed. Then, the image forming unit 10 generates a toner image on a surface of each of the image carriers by developing the electrostatic latent images with toner of the respective color components. The image forming unit 10 primarily transfers the toner images of the respective color components sequentially onto the intermediate transfer belt 22 that circularly moves in a direction of an arrow F1, the color components being generated in the plurality of respective toner image generation units 20. Thus, on a surface of the intermediate transfer belt 22, the image forming unit 10 generates a color image obtained by superimposing toner of each of the color components. Then, when the color image on the intermediate transfer belt 22 passes a position of the secondary transfer roller 23, the image forming unit 10 secondarily transfers the color image onto a surface of a recording medium 9 delivered by the delivery mechanism 11.

Ina case where the image data to be printed is a monochrome image, the image forming unit 10 causes a toner image generation unit 20 corresponding to color K to operate alone. In this case, the image forming unit 10 primarily transfers the monochrome image onto the intermediate transfer belt 22, and then secondarily transfers the monochrome image onto a recording medium 9 when the recording medium 9 passes the position of the secondary transfer roller 23.

The delivery mechanism 11 feeds a recording medium 9 from either the paper feed tray 3 or the manual feed tray 4, and delivers the recording medium 9 in a direction of an arrow F2 along a predetermined delivery path 33. The delivery mechanism 11 includes a pickup roller 31a that sends a recording medium 9 from the paper feed tray 3 toward the delivery path 33, and a paper feed roller 32a that feeds the recording medium 9 sent out by the pickup roller 31a to the delivery path 33. The paper feed roller 32a has a function of feeding one piece of recording medium 9 at a top to the delivery path 33 on a downstream side when a plurality of recording media 9 is sent out by the pickup roller 31a. The delivery mechanism 11 includes a pickup roller 31b that sends a recording medium 9 from the manual feed tray 4 toward the delivery path 33, and a paper feed roller 32b that feeds the recording medium 9 sent out by the pickup roller 31b to the delivery path 33. The paper feed roller 32b has a function of feeding one piece of recording medium 9 at a top to the delivery path 33 on a downstream side when a plurality of recording media 9 is sent out by the pickup roller 31b.

The delivery mechanism 11 includes a resist roller 34 upstream of the secondary transfer roller 23. The resist roller 34 temporarily stops delivery of recording media 9 with tips of the recording media aligned, the recording media 9 being fed by the paper feed rollers 32a and 32b. Then, the resist roller 34 supplies a recording medium 9 toward the position of the secondary transfer roller 23 at a timing when an image (color image or monochrome image) formed on the intermediate transfer belt 22 by the image forming unit 10 moves to the position of the secondary transfer roller 23.

The delivery mechanism 11 includes an ejection roller 37 that ejects a recording medium 9 onto the paper ejection tray 5, the recording medium 9 being subjected to fixing processing of an image in the fixing unit 12. From an ejection opening 38 onto the paper ejection tray 5, the ejection roller 37 ejects a recording medium 9 on which an image is formed.

The fixing unit 12 is provided downstream of a position of the secondary transfer roller 23 on which an image is secondarily transferred onto a recording medium 9. The fixing unit 12 performs fixing processing for fixing an image, which is transferred onto the recording medium 9, onto the recording medium 9. The fixing unit 12 includes a pair of fixing rollers 35 and 36. Of the pair of fixing rollers 35 and 36, one fixing roller 35 is a roller heated by a heater, which will be described later, and heats a recording medium 9. The another fixing roller 36 is disposed facing the fixing roller 35, and is pressure-contacted against a surface of the fixing roller 35 to pressurize a recording medium 9. Pressure contact force of the fixing roller 36 against the fixing roller 35 is adjustable. In this way, the fixing unit 12 fixes an image onto a recording medium 9 by heating and pressurizing the recording medium 9 when the recording medium 9 passes a nip of the pair of fixing rollers 35 and 36.

Further, the image formation apparatus 1 includes an envelope detection sensor 40, a basis weight detection sensor 50, and a loop detection sensor 60 on the delivery path 33 through which a recording medium 9 is delivered.

The envelope detection sensor 40 is provided between the paper feed rollers 32a and 32b and resist roller 34 on the delivery path 33, and detects whether or not a recording medium 9 fed by the paper feed rollers 32a and 32b is an envelope 15.

Figure 3A:
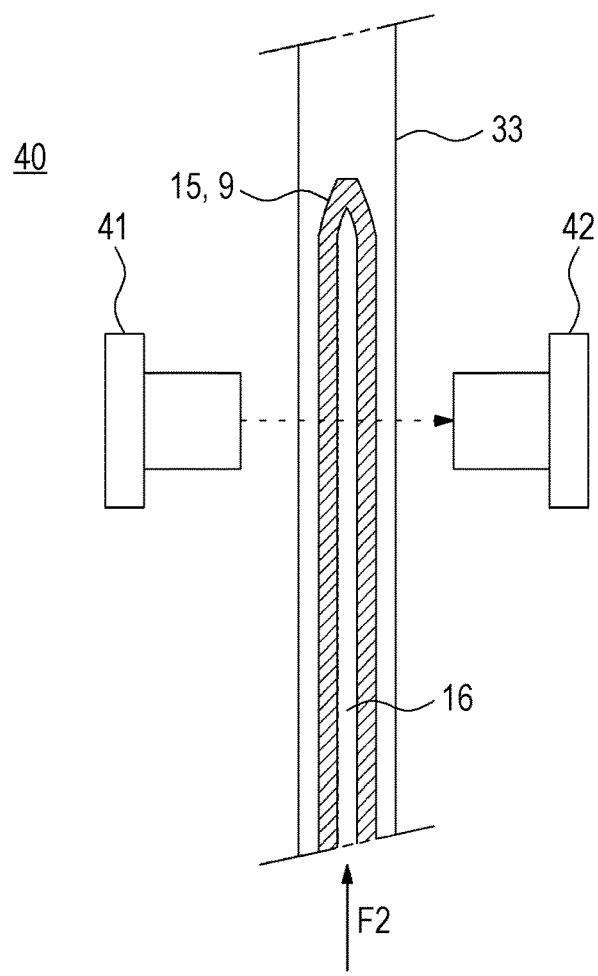
FIGS. 3A and 3B are diagrams showing a configuration example of an envelope detection sensor.
Figure 3B:
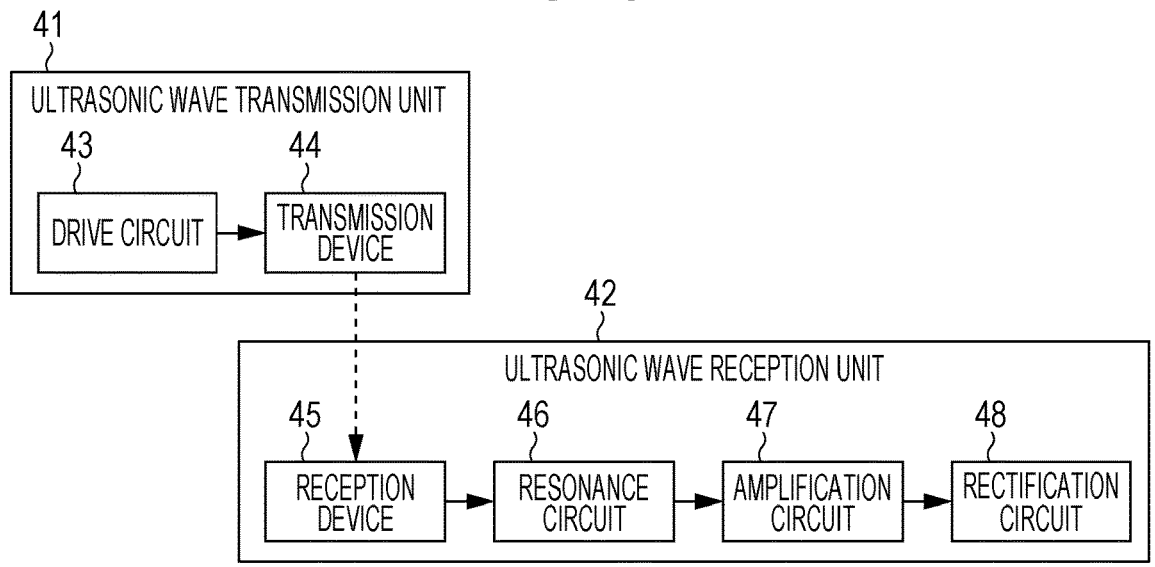

FIGS. 3A and 3B are diagrams showing a configuration example of the envelope detection sensor 40. For example, the envelope detection sensor 40 includes an ultrasonic sensor. As shown in FIG. 3A, the envelope detection sensor 40 includes an ultrasonic wave transmission unit 41 and an ultrasonic wave reception unit 42 provided at positions facing each other with the delivery path 33 for a recording medium 9 interposed therebetween. The ultrasonic wave transmission unit 41 transmits an ultrasonic wave having a predetermined frequency toward the ultrasonic wave reception unit 42. In a case where a recording medium 9 delivered along the delivery path 33 is an envelope 15, the envelope 15 has a hollow 16 inside a portion where two sheets overlap. Therefore, the ultrasonic wave transmitted from the ultrasonic wave transmission unit 41 attenuates in the hollow 16 of the envelope 15 and is received by the ultrasonic wave reception unit 42. Meanwhile, in a case where the recording medium 9 is not an envelope 15 but one piece of sheet, an amount of attenuation of the ultrasonic wave transmitted from the ultrasonic wave transmission unit 41 is smaller than an amount of attenuation in a case where the recording medium 9 is an envelope 15. Therefore, the envelope detection sensor 40 can detect whether or not the recording medium 9 is an envelope 15 by detecting whether or not the amount of attenuation of the ultrasonic wave transmitted from the ultrasonic wave transmission unit 41 is equal to or greater than a predetermined value.

FIG. 3B shows a detailed configuration example of the envelope detection sensor 40. The ultrasonic wave transmission unit 41 has a drive circuit 43 and a transmission device 44. The drive circuit 43 drives the transmission device 44 to cause the transmission device 44 to transmit an ultrasonic wave having a predetermined frequency (for example, 300 kHz). The ultrasonic wave is received by the ultrasonic wave reception unit 42 via a recording medium 9 delivered through the delivery path 33.

The ultrasonic wave reception unit 42 has a reception device 45, a resonance circuit 46, an amplification circuit 47, and a rectification circuit 48. The reception device 45 is a device that receives an ultrasonic wave and outputs an electric signal corresponding to the received ultrasonic wave. The resonance circuit 46 filters the electric signal output from the reception device 45 with a predetermined frequency (for example, 300 kHz) to extract a signal component of an ultrasonic wave transmitted from the ultrasonic wave transmission unit 41. The amplification circuit 47 amplifies the signal component of the ultrasonic wave and outputs the amplified signal component to the rectification circuit 48. The rectification circuit 48 rectifies the amplified signal to generate and output an analog voltage signal corresponding to intensity of the ultrasonic wave received by the reception device 45. The analog voltage signal has a value smaller than a predetermined value if a recording medium 9 is an envelope 15, and has a value equal to or greater than the predetermined value if the recording medium 9 is not an envelope 15. Therefore, the analog voltage signal output from the rectification circuit 48 is a signal indicating whether or not the recording medium 9 is an envelope 15.

The envelope detection sensor 40 also functions as a flap detecting unit for detecting a flap of the envelope 15 in a case where a recording medium 9 is an envelope 15. The envelope 15 has a portion where two sheets overlap and a flap where the two sheets do not overlap. In a case where the flap is positioned on a head end side or rear end side of a direction of delivering a recording medium 9, the envelope detection sensor 40 can detect a flap before or after the portion where the two sheets overlap.

The basis weight detection sensor 50 is provided between the paper feed rollers 32a and 32b and resist roller 34 on the delivery path 33, and detects a basis weight of a recording medium 9 fed by the paper feed rollers 32a and 32b. The basis weight detection sensor 50 according to the present embodiment is provided downstream of the envelope detection sensor 40 in the delivery path 33.

Figure 4:
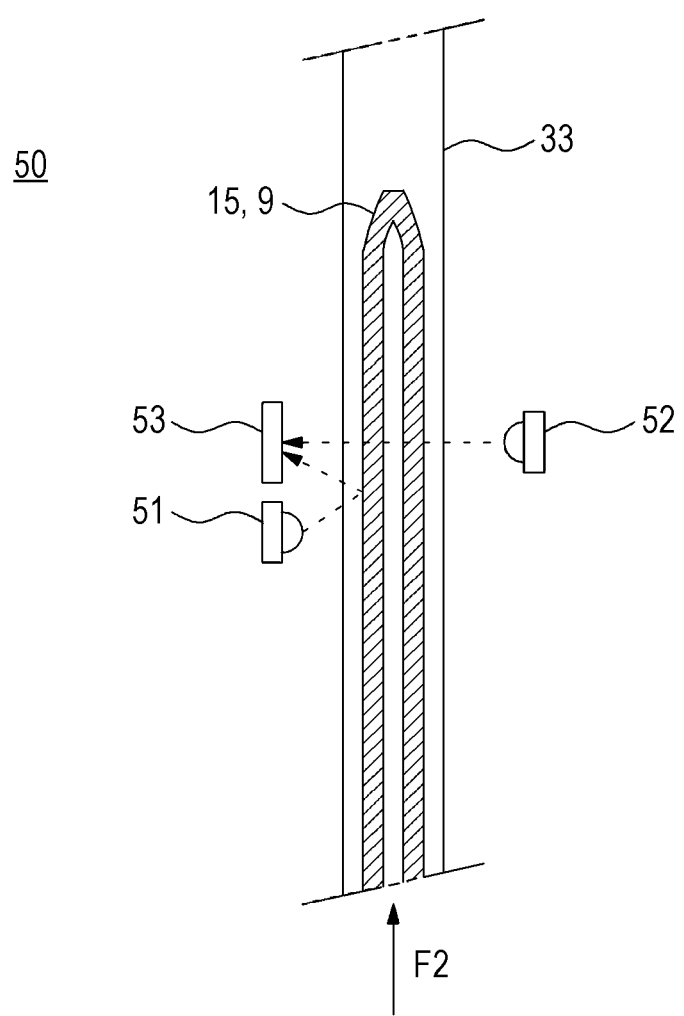
FIG. 4 is a diagram showing a configuration example of a basis weight detection sensor.

FIG. 4 is a diagram showing a configuration example of the basis weight detection sensor 50. The basis weight detection sensor 50 includes a light transmissive sensor and a light reflective sensor. That is, the basis weight detection sensor 50 includes a first light source 51 that emits first light toward the delivery path 33, a second light source 52 that emits second light toward the delivery path 33, and a light receiving element 53. The first light source 51 is a light source of the light reflective sensor. The second light source 52 is a light source of the light transmissive sensor. The light receiving element 53 serves as a light receiving element of both the light transmissive sensor and the light reflective sensor.

The first light source 51 is disposed on the same side as the light receiving element 53 with respect to the delivery path 33, and emits the first light toward the delivery path 33. When a recording medium 9 passes an area where the first light is emitted, the first light is reflected on a surface of the recording medium 9, and the reflected light is incident on and detected by the light receiving element 53.

The second light source 52 is disposed on an opposite side of the first light source 51 and the light receiving element 53 with the delivery path 33 interposed therebetween, and emits the second light toward the delivery path 33. When a recording medium 9 passes an area where the second light is emitted, the second light is transmitted through the recording medium 9, and the transmitted light is detected by the light receiving element 53.

The basis weight (weight per unit area) of a recording medium 9 varies depending on thickness of the recording medium 9. Therefore, the larger the basis weight of the recording medium 9, the smaller transmission amount of light emitted from the second light source 52. Further, the transmission amount of light emitted from the second light source 52 also varies depending on a tint of the recording medium 9. Therefore, the basis weight detection sensor 50 detects a basis weight of the recording medium 9 by measuring an amount of transmitted light emitted from the second light source 52, and detects the tint of the recording medium 9 by measuring reflected light of light emitted from the first light source 51. Then, by correcting a basis weight based on an amount of transmitted light according to the tint of the recording medium 9, the basis weight detection sensor 50 detects a basis weight of the recording medium 9 from which influence of the tint is excluded.

The loop detection sensor 60 is disposed between a position where an image is secondarily transferred onto a recording medium 9 and the fixing rollers 35 and 36. The loop detection sensor 60 is a sensor that detects a loop of a recording medium 9, which is formed by the recording medium 9 bending at a part between the position of the secondary transfer roller 23 and the fixing rollers 35 and 36.

Figure 5:
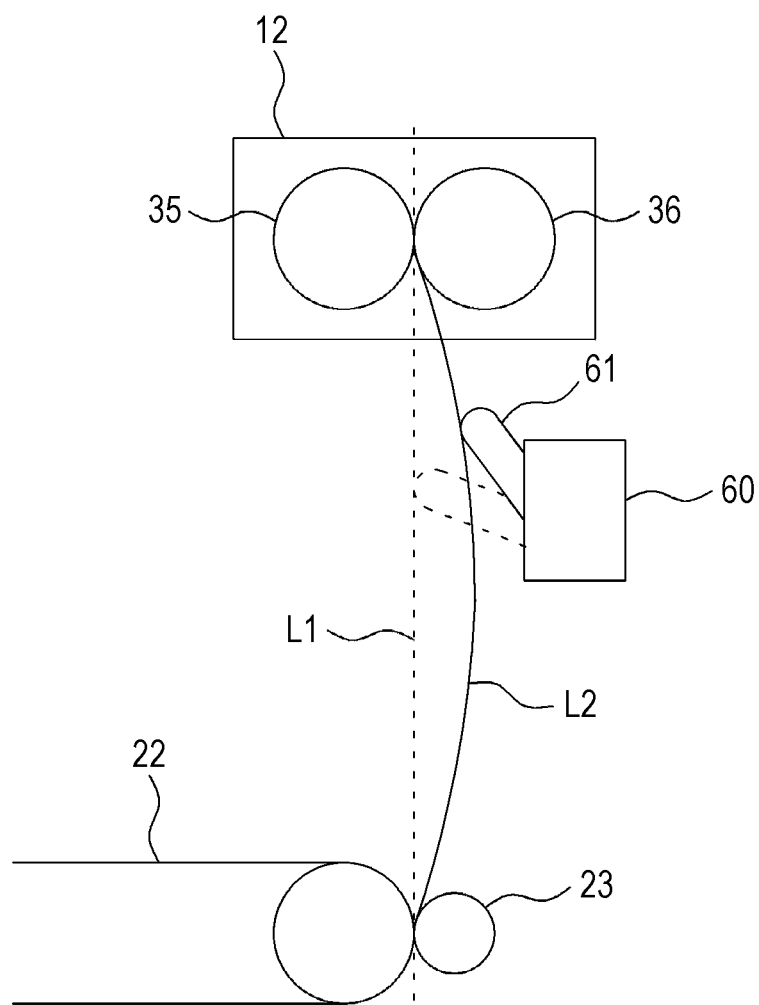
FIG. 5 is a diagram showing a configuration example of a loop detection sensor.

FIG. 5 is a diagram showing a configuration example of the loop detection sensor 60. In a case where no loop is formed on a recording medium 9 at the part between the position of the secondary transfer roller 23 and the fixing rollers 35 and 36, the recording medium 9 passes a path L1 shown by a broken line in FIG. 5. Meanwhile, if a loop is formed on the recording medium 9 at the part between the position of the secondary transfer roller 23 and the fixing rollers 35 and 36, the recording medium 9 passes a path L2 shown by a solid line in FIG. 5. The loop detection sensor 60 can detect a size of the loop. The loop of the recording medium 9 is formed in one direction in which the loop detection sensor 60 is disposed. For example, the loop detection sensor 60 includes an actuator 61 that displaces by coming into contact with a loop of a recording medium 9 as the loop is formed. The loop detection sensor 60 is formed so as to detect a size of a loop of a recording medium 9 according to a position of the actuator 61.

Figure 6:
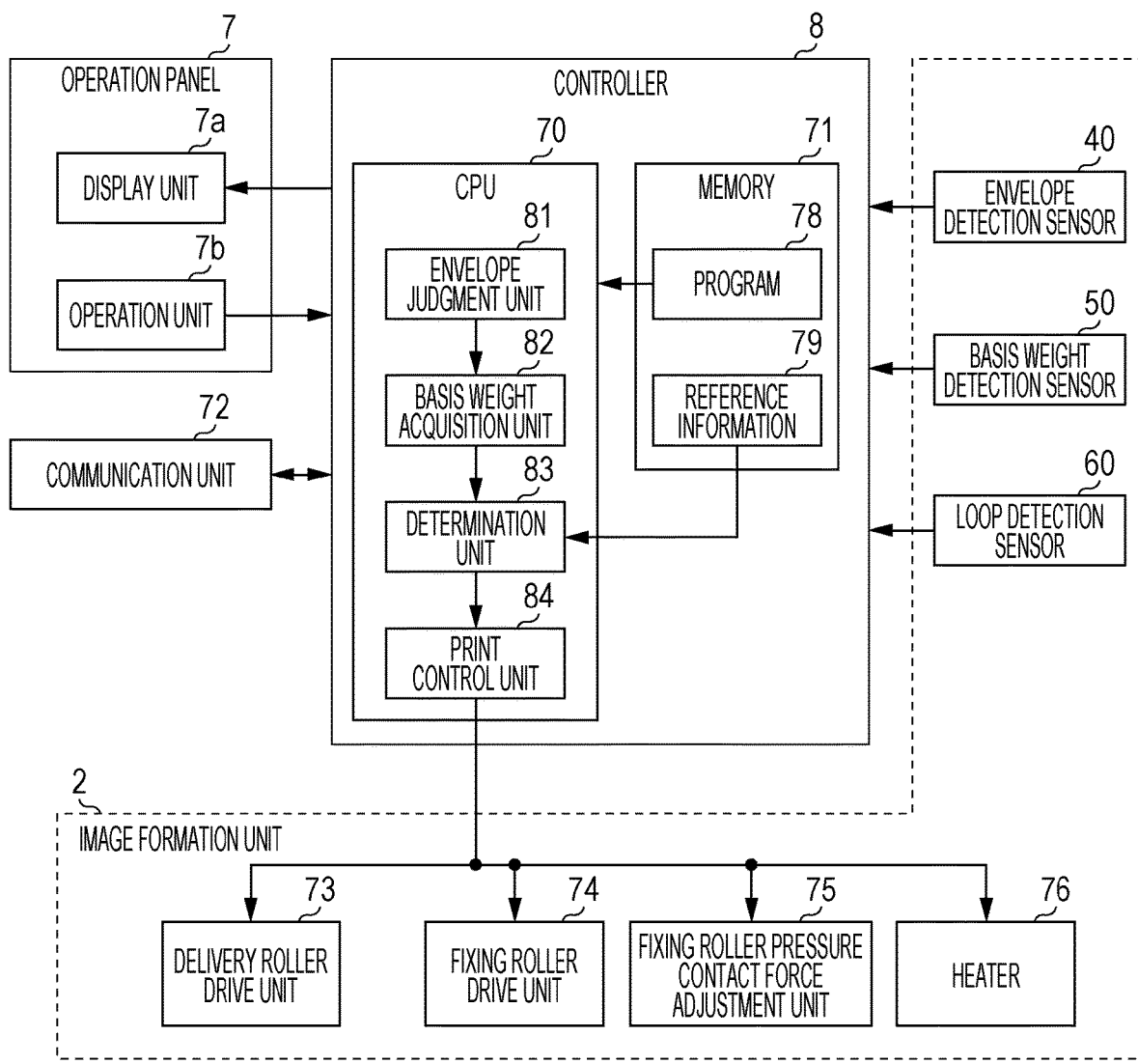
FIG. 6 is a block diagram showing a configuration example of a control mechanism of the image formation apparatus.

Next, a control mechanism of the image formation apparatus 1 will be described. FIG. 6 is a block diagram showing a configuration example of the control mechanism of the image formation apparatus 1. As shown in FIG. 6, the image formation apparatus 1 is formed such that the controller 8 controls operation of the image formation unit 2 described above. The controller 8 includes a central processing unit (CPU) 70 and a memory 71, and causes the image formation unit 2 to operate by the CPU 70 reading and executing a program 78 stored in the memory 71. The operation panel 7 and a communication unit 72 are connected to the controller 8.

The operation panel 7 includes a display unit 7a and an operation unit 7b. The display unit 7a includes, for example, a color liquid crystal display, and displays various operation screens that can be operated by the user. The operation unit 7b includes a touch panel key, or the like, and receives operation by the user. The controller 8 can acquire information input by the user via the operation panel 7, and can also control the image formation unit 2 on the basis of the information input by the user.

The communication unit 72 communicates with an external apparatus via a network such as a local area network (LAN). For example, the controller 8 can acquire image data to be printed from an external apparatus via the communication unit 72. Via the communication unit 72, the controller 8 can also acquire information for controlling the image formation unit 2.

The image formation unit 2 includes a delivery roller drive unit 73, a fixing roller drive unit 74, a fixing roller pressure contact force adjustment unit 75, and a heater 76.

The delivery roller drive unit 73 includes, for example, a motor, or the like that rotationally drives each of the rollers for delivering a recording medium 9 along the delivery path 33. The delivery roller drive unit 73 drives a plurality of rollers including the pickup rollers 31a and 31b, the paper feed rollers 32a and 32b, the resist roller 34, the secondary transfer roller 23, and the ejection roller 37. However, drive force of the delivery roller drive unit 73 is formed so as to be transmitted to each of the rollers via an electromagnetic clutch. Therefore, for example, it is possible to supply a recording medium 9 to the secondary transfer roller 23 at an appropriate timing by stopping drive of the resist roller 34 at a timing when a tip of the recording medium 9 reaches the resist roller 34 and driving the resist roller 34 again at a timing when an image primarily transferred onto the intermediate transfer belt 22 reaches a predetermined position.

When starting paper feeding operation of a recording medium 9, the delivery roller drive unit 73 sets system velocity designated by the controller 8 to drive each of the rollers. The system velocity is delivery velocity when a recording medium 9 is delivered along the delivery path 33. The delivery roller drive unit 73 can change velocity of delivering a recording medium 9 according to system velocity if the controller 8 gives an instruction to change the system velocity after the delivery roller drive unit 73 starts delivery of the recording medium 9. For example, the delivery roller drive unit 73 can change the system velocity according to thickness of the recording medium 9 detected by the controller 8.

The fixing roller drive unit 74 is a drive unit such as a motor that rotationally drives the fixing rollers 35 and 36. That is, the fixing rollers 35 and 36 are rotationally driven by a drive source different from each of the rollers for delivering a recording medium 9 along the delivery path 33. Therefore, velocity of delivering a recording medium 9 by the fixing rollers 35 and 36 can be set to the same velocity as velocity of delivering the recording medium 9 by each of the rollers, or to velocity different from the velocity of delivering the recording medium 9 by each of the rollers.

The fixing roller pressure contact force adjustment unit 75 adjusts pressure contact force of the fixing roller 36 on the fixing roller 35 in the fixing unit 12. For example, the fixing roller pressure contact force adjustment unit 75 presses and energizes the fixing roller 36 toward the fixing roller 35, and adjusts the pressure contact force by adjusting the press force.

The heater 76 is a heat source for heating the fixing roller 35 of the fixing unit 12. The heater 76 is driven by the controller 8 and is formed to heat the fixing roller 35 to maintain a predetermined fixing temperature. The fixing temperature differs depending on a type of a recording medium 9.

The controller 8 is formed to control each of the delivery roller drive unit 73, the fixing roller drive unit 74, the fixing roller pressure contact force adjustment unit 75, and the heater 76 on the basis of a detection result from each of the envelope detection sensor 40, the basis weight detection sensor 50, and the loop detection sensor 60, which are included in the image formation unit 2. Although not shown in FIG. 6, the controller 8 controls operation of the above-described image forming unit 10, needless to say. A detailed configuration and operation of the controller 8 will be described below.

As shown in FIG. 6, the CPU 70 of the controller 8 functions as an envelope judgment unit 81, a basis weight acquisition unit 82, a determination unit 83, and a print control unit 84 by executing the program 78.

The print control unit 84 drives the image formation unit 2 to control image forming operation on a recording medium 9. The print control unit 84 drives the image formation unit 2 to start printing operation for forming an image on a recording medium 9 in a case where an instruction on execution of a print job is given via the communication unit 72, or in a case where an instruction on execution of a print job is given via the operation panel 7. With the start of the printing operation, the print control unit 84 drives the delivery roller drive unit 73, feeds a recording medium 9 from a tray among the paper feed tray 3 and the manual feed tray 4, whichever is designated by the user, and delivers the recording medium 9 along the delivery path 33. At this time, the print control unit 84 starts the delivery of the recording medium 9 by setting system velocity corresponding to plain paper on assumption that the recording medium 9 is plain paper, for example. Further, the print control unit 84 starts operation of generating a toner image in the image forming unit 10 with the start of delivering the recording medium 9. Thereafter, on the basis of a determination result from the determination unit 83, the print control unit 84 can appropriately change control for when forming an image on the recording medium 9.

The envelope judgment unit 81 is a processing unit that judges whether or not a recording medium 9 delivered along the delivery path 33 is an envelope. When the print control unit 84 starts delivering a recording medium 9, the envelope judgment unit 81 drives the envelope detection sensor 40, and causes the envelope detection sensor 40 to detect whether or not the recording medium 9 is an envelope 15 when the recording medium 9 passes a position of the envelope detection sensor 40. Then, the envelope judgment unit 81 acquires a detection result output from the envelope detection sensor 40 and judges whether or not the recording medium 9 is an envelope on the basis of the detection result.

The basis weight acquisition unit 82 is a processing unit that acquires a basis weight of a recording medium 9 delivered along the delivery path 33. When the print control unit 84 starts delivering a recording medium 9, the basis weight acquisition unit 82 drives the basis weight detection sensor 50, and causes the basis weight detection sensor 50 to detect a basis weight of the recording medium 9 when the recording medium 9 passes a position of the basis weight detection sensor 50. Then, the basis weight acquisition unit 82 acquires a basis weight detection result output from the basis weight detection sensor 50. For example, in a case where the envelope judgment unit 81 judges that the recording medium 9 is an envelope 15, the basis weight acquisition unit 82 acquires a basis weight of the envelope 15 detected by the basis weight detection sensor 50. Further, in a case where the envelope judgment unit 81 judges that the recording medium 9 is not an envelope 15 but one piece of sheet, the basis weight acquisition unit 82 acquires a basis weight of the one piece of sheet detected by the basis weight detection sensor 50.

In a case where the recording medium 9 is an envelope 15, a basis weight that the basis weight detection sensor 50 detects at a portion where two sheets overlap and a basis weight that the basis weight detection sensor 50 detects at a flap where two sheets do not overlap are different. This is because an amount of transmitted light of light emitted from the second light source 52 may be lowered at the portion where the two sheets overlap than at a flap, tint of the portion where the two sheets overlap may be slightly different from tint of the flap, and an amount of reflected light of light emitted from the first light source 51 may vary. Therefore, the basis weight acquisition unit 82 drives the basis weight detection sensor 50 so as to detect basis weight at either the portion where the two sheets overlap or the flap.

FIGS. 7A to 7D are diagrams describing operation of the envelope detection sensor 40 and the basis weight detection sensor 50. On the delivery path 33 through which a recording medium 9 is delivered, the envelope detection sensor 40 is disposed upstream of the basis weight detection sensor 50. Therefore, as shown in FIG. 7A, a recording medium 9 delivered in a direction of an arrow F2 along the delivery path 33 first passes the position of the envelope detection sensor 40, and then passes the position of the basis weight detection sensor 50. Velocity of delivering of the recording medium 9 is known, and a distance between the envelope detection sensor 40 and the basis weight detection sensor 50 is also known. Therefore, it is possible to predict a timing when the same portion as the portion detected by the envelope detection sensor 40 passes the position of the basis weight detection sensor 50. For example, as shown in FIG. 7B, a portion 17 where two sheets of the envelope 15 overlap passes the position of the basis weight detection sensor 50 after a predetermined time from a time when the envelope detection sensor 40 detects the same overlapping portion 17. Therefore, the basis weight acquisition unit 82 can cause the basis weight detection sensor 50 to detect a basis weight of the portion 17 where two sheets of the envelope 15 overlap as shown in FIG. 7C by causing the basis weight detection sensor 50 to detect the basis weight after a predetermined time from a time when the envelope detection sensor 40 detects the portion 17 where two sheets of the envelope 15 overlap.

Further, as shown in FIG. 7C, a flap 18 of the envelope 15 passes the position of the basis weight detection sensor 50 after a predetermined time from a time when the envelope detection sensor 40 detects the flap 18. Therefore, the basis weight acquisition unit 82 can cause the basis weight detection sensor 50 to detect a basis weight of the flap 18 of the envelope 15 as shown in FIG. 7D by causing the basis weight detection sensor 50 to detect the basis weight after a predetermined time from a time when the envelope detection sensor 40 detects the flap 18 of the envelope 15.

The basis weight detection sensor 50 can detect a basis weight of a flap 18 of an envelope 15 in a similar manner to a case where a recording medium 9 is one piece of sheet. However, in a case where the basis weight detection sensor 50 detects a basis weight of a portion 17 where two sheets of the envelope 15 overlap, an amount of transmitted light of light emitted from the second light source 52 may be lowered, and an amount of reflected light of light emitted from the first light source 51 may vary. Therefore, in this case, the basis weight may not be able to be detected properly. Therefore, it is preferable that the basis weight acquisition unit 82 cause the basis weight detection sensor 50 to detect a basis weight of a portion 17 where two sheets of the envelope 15 overlap by using a method different from a basis weight detection method used in a case where a recording medium 9 is one piece of sheet. That is, the basis weight acquisition unit 82 sets a basis weight detection method by the basis weight detection sensor 50 to a first method in a case where the envelope judgment unit 81 judges the recording medium 9 not to be an envelope 15, and to a second method in a case where the envelope judgment unit 81 judges the recording medium 9 to be an envelope 15, the second method being different from the first method. Specifically, in a case where the envelope judgment unit 81 judges the recording medium 9 is an envelope 15, the basis weight acquisition unit 82 uses the second method to detect the basis weight. For the second method, an amount of light or sensitivity of the light transmissive sensor or light reflective sensor in the basis weight detection sensor 50 is increased as compared to the first method used in a case where the recording medium 9 is not an envelope 15. Thus, it is possible to reduce influence of a decrease in an amount of transmitted light of light emitted from the second light source 52 or of a change in an amount of reflected light of light emitted from the first light source 51, achieving proper detection of a basis weight of the envelope 15.

Figure 8A:
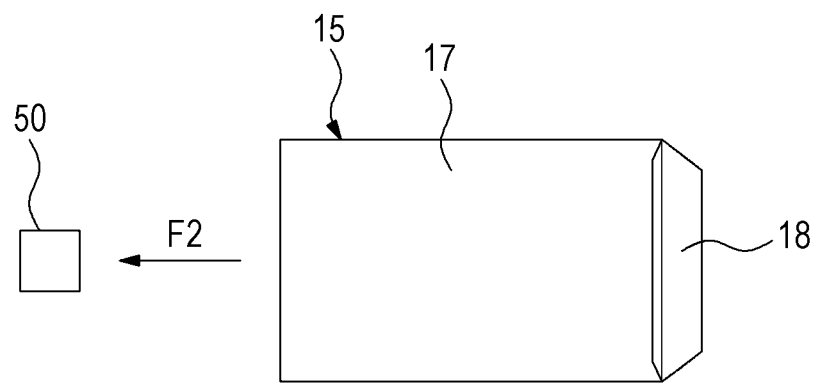
FIGS. 8A and 8B are diagrams exemplifying an aspect of delivering an envelope.
Figure 8B:
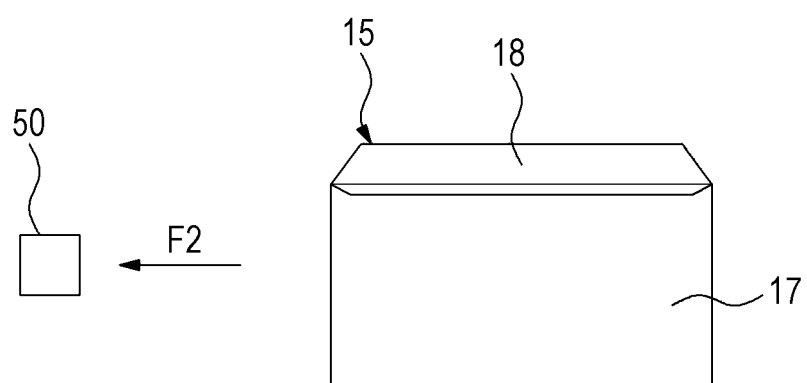

In a case where the basis weight detection sensor 50 detects a basis weight of a flap 18 of an envelope 15, it is not necessary to switch the basis weight detection method as described above. Therefore, processing load on the controller 8 is reduced. However, in a case where the recording medium 9 is an envelope 15, depending on a type or orientation of the envelope 15 delivered through the delivery path 33, it may be difficult to detect a basis weight by the flap 18. FIGS. 8A and 8B are diagrams exemplifying a plurality of types of envelopes 15 delivered in a delivery direction F2. For example, as shown in FIG. 8A, in a case where a flap 18 of an envelope 15 is on a rear end side of the delivery direction F2, the flap 18 passes a position detected by the basis weight detection sensor 50. Therefore, in a case where an envelope 15 is delivered in an orientation shown in FIG. 8A, the basis weight detection sensor 50 can detect a basis weight of a flap 18 of the envelope 15. Similarly, in a case where a flap 18 of an envelope 15 is on a head end side of the delivery direction F2, the flap 18 passes a position detected by the basis weight detection sensor 50. Therefore, the basis weight detection sensor 50 can detect a basis weight of the flap 18 of the envelope 15.

Meanwhile, as shown in FIG. 8B, in a case where a flap 18 of an envelope 15 is at an end of a direction orthogonal to the delivery direction F2, the flap 18 does not necessarily pass a position detected by the basis weight detection sensor 50. Therefore, in a case where an envelope 15 is delivered in an orientation shown in FIG. 8B, there may be a case where the basis weight detection sensor 50 cannot detect a basis weight of a flap 18 of the envelope 15. In such a case, it is preferable that the basis weight acquisition unit 82 cause the basis weight detection sensor 50 to detect a basis weight of a portion 17 where two sheets of the envelope 15 overlap, because the envelope detection sensor 40 also cannot detect the flap 18 of the envelope 15.

The determination unit 83 is a processing unit that determines control for when an image is formed on a recording medium 9 on the basis of a judgment result from the envelope judgment unit 81 and a basis weight acquired by the basis weight acquisition unit 82. The determination unit 83 reads reference information 79 stored in advance in the memory 71, and determines the control on the basis of reference information 79.

FIG. 9 is a diagram showing an example of the reference information 79. The reference information 79 is information in which system velocity Vs, fixing roller velocity Vt, whether or not loop control is performed, fixing temperature T, and fixing roller pressure contact force FP are defined in advance for each type of the recording media 9.

For example, in a case where the recording medium 9 is a sheet and the sheet is plain paper, the reference information 79 defines first velocity V1 as system velocity Vs. The first velocity V1 is, for example, 200 mm/s. In addition, it is defined that the fixing roller velocity Vt should be set to equal to the system velocity Vs, the loop control should be set to "performed", the fixing temperature T should be set to first temperature T1, and the fixing roller pressure contact force FP should be set to first pressure contact force FP1. The loop control is a control by which a recording medium 9 is supplied to the fixing unit 12 with a loop of the recording medium 9 formed upstream of the fixing unit 12. The first temperature T1 is, for example, 170° C. The first pressure contact force FP1 is a standard pressure contact force (normal pressure contact force) for when an image is formed on a recording medium 9 in the image formation apparatus 1.

In a case where the recording medium 9 is a sheet and the sheet is thin paper, the reference information 79 defines first velocity V1 as system velocity Vs, as in a case of plain paper. In addition, it is defined that the fixing roller velocity Vt should be set to equal to the system velocity Vs, the loop control should be set to "performed", the fixing temperature T should be set to second temperature T2, and the fixing roller pressure contact force FP should be set to second pressure contact force FP2. The second temperature T2 is, for example, 150° C. The second pressure contact force FP2 is pressure contact force smaller than pressure contact force of the first pressure contact force FP1. That is, because thin paper is thinner than plain paper, the fixing temperature T can be lowered and pressure contact force FP of the fixing roller 36 can be reduced.

In a case where the recording medium 9 is a sheet and the sheet is thick paper, the reference information 79 defines second velocity V2 as system velocity Vs, the second velocity V2 being lower than the first velocity V1. In addition, it is defined that the fixing roller velocity Vt should be set to equal to the system velocity Vs, the loop control should be set to "performed", the fixing temperature T should be set to second temperature T2, and the fixing roller pressure contact force FP should be set to third pressure contact force FP3. The second velocity V2 is, for example, 100 mm/s. The third pressure contact force FP3 is pressure contact force greater than pressure contact force of the first pressure contact force FP1. That is, for thick paper, system velocity Vs is lowered so that an image is properly transferred onto a sheet. Therefore, fixing temperature T can be lowered as in a case of thin paper. However, in order to properly fix an image onto thick paper, it is preferable that pressure contact force FP of the fixing roller 36 be greater than the normal pressure contact force.

Meanwhile, in a case where a recording medium 9 is an envelope 15 and the envelope is a thin envelope, the reference information 79 defines first velocity V1 as system velocity Vs. In addition, it is defined that the fixing roller velocity Vt should be set to about a few percent faster than the system velocity Vs, the loop control should be set to "not performed", the fixing temperature T should be set to lower than the first temperature T1, and the fixing roller pressure contact force FP should be set to smaller than the first pressure contact force FP1.

A thin envelope is susceptible to wrinkling when passing the fixing unit 12 if a loop is formed upstream of the fixing unit 12. Especially when the thin envelope is skewed, wrinkling is noticeable. This phenomenon occurs when a bent generated in a portion 17 where two sheets of the envelope 15 overlap is fixed as is in the fixing unit 12. Therefore, it is defined that, for a thin envelope, velocity (fixing roller velocity Vt) of delivery by the fixing rollers 35 and 36 should be set to velocity slightly faster than system velocity Vs so that a loop is not formed upstream of the fixing unit 12. However, if the fixing rollers 35 and 36 pull the thin envelope too much, an image secondarily transferred onto the thin envelope by the secondary transfer roller 23 may be disturbed. Therefore, difference in velocity between the fixing roller velocity Vt and the system velocity Vs is preferably kept within a few percent. If the loop is not formed upstream of the fixing unit 12, the fixing roller velocity Vt may be set to velocity equal to the system velocity Vs.

Further, because a thin envelope is thicker than thin paper, the fixing temperature T is higher than fixing temperature of the thin paper. However, the fixing roller pressure contact force FP may be pressure contact force similar to a case of thin paper.

In a case where the recording medium 9 is an envelope 15 and the envelope is a thick envelope, the reference information 79 defines second velocity V2 as system velocity Vs. In addition, it is defined that the fixing roller velocity Vt should be set to equal to the system velocity Vs, the loop control should be set to "performed", the fixing temperature T should be set to lower than the first temperature T1, and the fixing roller pressure contact force FP should be set to normal pressure contact force that is the same as the first pressure contact force FP1.

For a thick envelope, system velocity Vs is lowered so that an image is properly transferred onto a sheet. Therefore, fixing temperature T can be lowered as in a case of a thin envelope. However, fixing temperature T for a thick envelope may be lower than fixing temperature T for a thin envelope. In order to properly fix an image on a thick envelope, it is preferable that pressure contact force FP of the fixing roller 36 be greater than pressure contact force FP for a thin envelope. Therefore, for a thick envelope, it is defined that pressure contact force FP of the fixing roller 36 should be set to the same as normal pressure contact force.

In the examples in FIG. 9, only two types of envelopes, a thin envelope and a thick envelope, are shown as examples of an envelope 15. However, reference information 79 may be used, the reference information 79 defining specific control for three or more types of envelopes according to thickness of the envelope 15.

The determination unit 83 determines control for when an image is formed on a recording medium 9 on the basis of the reference information 79 as described above. For example, when the envelope judgment unit 81 judges that the recording medium 9 is an envelope 15, the determination unit 83 identifies thickness of the envelope 15 on the basis of a basis weight of the envelope 15 acquired by the basis weight acquisition unit 82, and judges whether the envelope 15 is a thin envelope or a thick envelope. In a case where the envelope 15 is a thin envelope as a result, the determination unit 83 refers to a field of thin envelope in the reference information 79, and determines system velocity Vs, fixing roller velocity Vt, loop control "not performed", fixing temperature T, and fixing roller pressure contact force FP, which are suitable for the thin envelope. In a case where the envelope judgment unit 81 judges that the envelope 15 is a thick envelope, the determination unit 83 refers to a field of thick envelope in the reference information 79, and determines system velocity Vs, fixing roller velocity Vt, loop control "performed", fixing temperature T, and fixing roller pressure contact force FP, which are suitable for the thick envelope. Then, the determination unit 83 outputs the determination result to the print control unit 84.

In a case where the envelope judgment unit 81 has judged that the recording medium 9 is one piece of sheet, the determination unit 83 determines control corresponding to a type of sheet on the basis of the reference information 79, and notifies the print control unit 84 of the determined control.

Determination by the determination unit 83 is made, at latest, before a tip of the recording medium 9 is sent downstream of the resist roller 34. That is, the determination unit 83 determines the control while delivery of the recording medium 9 by the resist roller 34 is temporarily stopped before or after the tip of the recording medium 9 reaches the resist roller 34.

After starting delivery of the recording medium 9, the print control unit 84 temporarily stops the delivery of the recording medium 9 at a timing when the tip of the recording medium 9 reaches the resist roller 34. Thereafter, the print control unit 84 drives the resist roller 34 again and sends the tip of the recording medium 9 toward the secondary transfer roller 23 at a timing when an image primarily transferred onto the intermediate transfer belt 22 by the image forming unit 10 reaches the position of the secondary transfer roller 23. At this time, the print control unit 84 performs control that reflects the determination result from the determination unit 83. For example, in a case where the determination unit 83 has determined that system velocity Vs is to be reduced, the print control unit 84 reduces the system velocity Vs when the resist roller 34 is driven again, and reduces velocity of delivering the recording medium 9. The print control unit 84 sets the velocity of delivering the recording medium 9 by the fixing rollers 35 and 36 to a fixing roller velocity Vt determined by the determination unit 83, and rotationally drives the fixing rollers 35 and 36. The print control unit 84 performs control to form or not to form a loop of the recording medium 9 upstream of the fixing unit 12 on the basis of whether or not loop control is performed determined by the determination unit 83. For example, for a thin envelope, the loop control is determined to be "not performed". Therefore, the print control unit 84 adjusts system velocity Vs and fixing roller velocity Vt so that the loop detection sensor 60 does not detect a loop of the recording medium 9. By driving the heater 76, the print control unit 84 sets fixing temperature T in the fixing unit 12 to a temperature determined by the determination unit 83. By driving the fixing roller pressure contact force adjustment unit 75, the print control unit 84 adjusts pressure contact force of the fixing roller 36 to a value determined by the determination unit 83.

For example, in a case where the recording medium 9 is an envelope 15, the print control unit 84 can switch control for when an image is formed on the envelope 15 according to thickness of the envelope 15. In other words, the print control unit 84 selects an optimum control parameter corresponding to the thickness of the envelope 15 and performs control so that the image is formed on the envelope 15. Thus, when a thick envelope passes the fixing unit 12, image formation suitable for a thick envelope is performed by a first control parameter suitable for a thick envelope being applied. Meanwhile, when a thin envelope passes the fixing unit 12, image formation suitable for a thin envelope is performed by a second control parameter suitable for a thin envelope being applied, the second control parameter being a control parameter different from a control parameter for a thick envelope. Therefore, even in a case where an image is formed on a thin envelope 15 as a recording medium 9 for example, the conventional image formation apparatus 1 according to the present embodiment can reduce wrinkling of an envelope 15, and therefore deterioration of quality of a printed material can be reduced.

Figure 10:
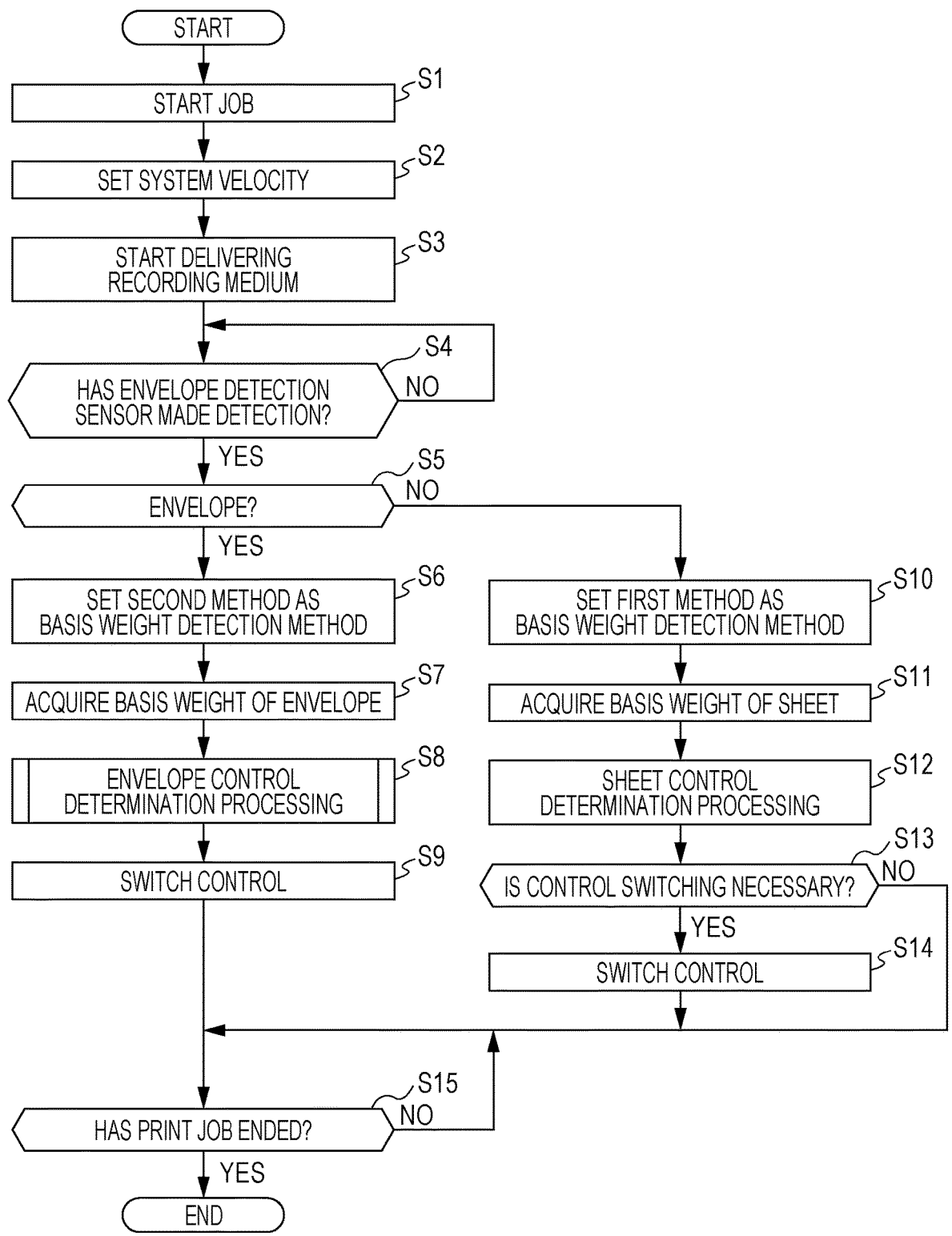
FIG. 10 is a flowchart showing an example of a processing procedure performed by a controller.

Next, FIG. 10 is a flowchart showing an example of a processing procedure performed by the controller 8. The processing is performed by the CPU 70 executing the program 78. In addition, the processing is processing started in a case where the user gives an instruction on execution of a print job.

When the processing is started, the controller 8 starts a print job (step S1). Accordingly, the controller 8 sets the system velocity Vs to the first velocity V1 (step S2). That is, the controller 8 sets the system velocity Vs to the first velocity V1 on assumption that the recording medium 9 is plain paper, because whether or not the recording medium 9 is the envelope 15 is unknown at this point. Then, the controller 8 starts operation of supplying and delivering the recording medium 9 to the delivery path 33 from either the paper feed tray 3 or the manual feed tray 4 by driving the delivery roller drive unit 73 (step S3).

When delivery of the recording medium 9 is started, the controller 8 judges whether or not the envelope detection sensor 40 has detected the recording medium 9 (step S4). If the envelope detection sensor 40 detects the recording medium 9 (YES in step S4), the controller 8 judges whether or not the recording medium 9 is the envelope 15 on the basis of detection result of the envelope detection sensor 40 (step S5).

In a case where the recording medium 9 is the envelope 15 (YES in step S5), the controller 8 sets the second method as a method for detection by the basis weight detection sensor 50 (step S6). For example, as described above, the controller 8 specifies a setting so that basis weight can be detected at a portion 17 where two sheets of the envelope 15 overlap by increasing an amount of light of the first light source 51 and second light source 52 to higher than a normal amount of light (amount of light when detecting basis weight of one piece of sheet), or by increasing sensitivity of the light receiving element 53 to higher than a normal sensitivity (sensitivity when detecting basis weight of one piece of sheet). Thereafter, the controller 8 drives the basis weight detection sensor 50 to acquire basis weight of the envelope 15 from the basis weight detection sensor 50 (step S7). After being able to acquire basis weight of the envelope 15, the controller 8 executes envelope control determination processing (step S8).

Figure 11:
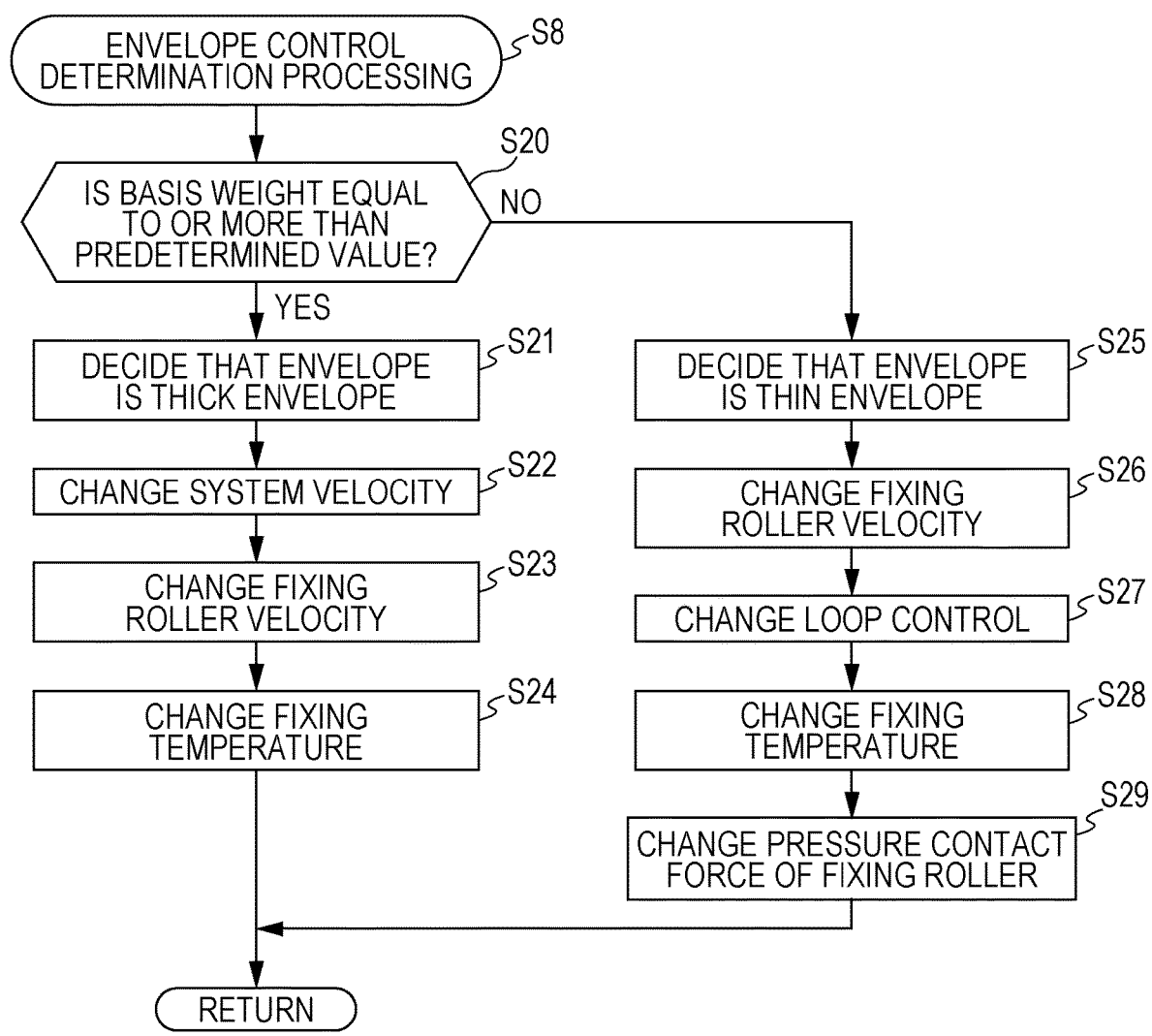
FIG. 11 is a flowchart showing an example of a detailed processing procedure of envelope control determination processing.

FIG. 11 is a flowchart showing an example of a detailed processing procedure of the envelope control determination processing (step S8). When starting the processing, the controller 8 judges whether or not the basis weight of the envelope 15 detected by the basis weight detection sensor 50 is equal to or more than a predetermined value (step S20). As a result, if the basis weight of the envelope 15 is equal to or greater than the predetermined value (YES in step S20), the controller 8 decides that the envelope is a thick envelope (step S21). If deciding that the envelope is a thick envelope, the controller 8 changes a setting of the system velocity Vs on the basis of the reference information 79 (step S22). In addition, the controller 8 changes a setting of fixing roller velocity Vt (step S23) and changes a setting of fixing temperature T on the basis of the reference information 79 (step S24).

Meanwhile, if the basis weight of the envelope 15 is less than the predetermined value (NO in step S20), the controller 8 decides that the envelope is a thin envelope (step S25). If deciding that the envelope is a thin envelope, the controller 8 changes a setting of the fixing roller velocity Vt on the basis of the reference information 79 (step S26). That is, in a case where the basis weight of the envelope 15 is less than a predetermined value, the controller 8 sets velocity of delivering the envelope 15 by the fixing rollers 35 and 36 to higher than normal delivery velocity (first velocity v1). In addition, the controller 8 changes a setting so as not to perform loop control (step S27). Further, the controller 8 changes a setting of the fixing temperature T on the basis of the reference information 79 (step S28). That is, in a case where the basis weight of the envelope 15 is less than a predetermined value, the controller 8 changes a setting of the fixing temperature T of the fixing roller 35 to a temperature lower than a normal fixing temperature (first temperature T1). In addition, the controller 8 changes a setting of pressure contact force of the fixing roller 36 (step S29). That is, in a case where the basis weight of the envelope 15 is less than a predetermined value, the controller 8 changes a setting of pressure contact force FP of the fixing roller 36 to a force weaker than a normal pressure contact force (first pressure contact force FP1). This completes the envelope control determination processing.

Returning to the flowchart in FIG. 10, the controller 8 switches a control of subsequent image forming operation to a control determined in the envelope control determination processing (step S8) (step S9). Then, the controller 8 applies the switched control to control the subsequent image forming operation. As a result, if the recording medium 9 is the envelope 15, control corresponding to the thickness of the envelope 15 is performed, by which deterioration of quality of a printed material can be reduced.

In a case where the recording medium 9 is not the envelope 15, but one piece of sheet (NO in step S5), the controller 8 sets the first method as a method for detection by the basis weight detection sensor 50 (step S10). For example, by setting an amount of light of the first light source 51 and second light source 52 to a normal amount of light, and setting sensitivity of the light receiving element 53 to normal sensitivity, the controller 8 specifies a setting so that a basis weight of one piece of sheet can be properly detected. Thereafter, the controller 8 drives the basis weight detection sensor 50 to acquire basis weight of the sheet from the basis weight detection sensor 50 (step S11). After being able to acquire basis weight of the envelope 15, the controller 8 executes sheet control determination processing (step S12). Similarly to the envelope control determination processing, the sheet control determination processing is processing for determining control when image is formed on the sheet on the basis of the reference information 79. When the sheet control determination processing is performed, the controller 8 judges whether or not it is necessary to switch control of the image forming operation (step S13). At a start of a print job, plain paper is set as a default. Therefore, when the sheet is thin paper or thick paper other than plain paper, it is necessary to switch the control. If judging that it is necessary to switch the control of the image formation operation (YES in step S13), the controller 8 switches a control of subsequent image forming operation to a control determined in the sheet control determination processing (step S12) (step S14). Then, the controller 8 applies the switched control to control the subsequent image forming operation. As a result, the image formation apparatus 1 performs image forming suitable for thin paper or thick paper.

Meanwhile, if judging that it is not necessary to switch the control of the image formation operation (NO in step S13), the controller 8 controls the subsequent image forming operation without switching the control of the image forming operation. As a result, the image formation apparatus 1 performs image forming suitable for plain paper.

Thereafter, the controller 8 waits until the print job ends (step S15). Then, when the print job ends (YES in step S15), all the processing by the controller 8 ends.

As described above, the image formation apparatus 1 according to the present embodiment includes the image formation unit 2 that forms an image on a recording medium 9 delivered along a predetermined delivery path 33 and outputs the recording medium 9, the envelope judgment unit 81 that judges whether or not the recording medium 9 is an envelope 15, the basis weight acquisition unit 82 that acquires a basis weight of the recording medium 9, the determination unit 83 that determines control for when an image is formed on the recording medium 9 on the basis of a judgment result from the envelope judgment unit 81 and a basis weight acquired by the basis weight acquisition unit 82, and the print control unit 84 that controls operation of the image formation unit 2 on the basis of a determination result from the determination unit 83. Therefore, even in a case where the image formation apparatus 1 uses an envelope 15 as a recording medium 9 to form an image, the image formation apparatus 1 can form an image with optimum operation according to a basis weight of the envelope 15. Specifically, when forming an image on a thick envelope, image formation with optimum operation according to the thick envelope can be performed, meanwhile when forming an image on a thin envelope, image formation with optimum operation corresponding to the thin envelope can be performed. Thus, it is possible to output a high-quality printed material while reducing wrinkling of a thin envelope.

The present embodiment exemplifies the case where the basis weight acquisition unit 82 causes the basis weight detection sensor 50 to detect a basis weight in both cases where a recording medium 9 is judged to be an envelope 15 and where the recording medium 9 is judged not to be an envelope 15. However, not limited to this, a configuration may be employed in which the basis weight acquisition unit 82 causes the basis weight detection sensor 50 to detect a basis weight of an envelope 15 exclusively in a case where a recording medium 9 is judged to be an envelope 15. By detecting a basis weight of an envelope 15 when a recording medium 9 is the envelope 15, the image formation apparatus 1 can perform image formation with optimum operation according to the basis weight of the envelope 15.

The flowchart shown in FIG. 10 exemplifies a case where a basis weight detection method by the basis weight detection sensor 50 is set to the first method in a case where the recording medium 9 is judged not to be an envelope 15, and to the second method in a case where the recording medium 9 is judged to be an envelope 15, the second method being different from the first method. However, this is processing on a premise that a basis weight is detected at a portion 17 where two sheets of the envelope 15 overlap. Meanwhile, if the basis weight detection sensor 50 is caused to detect a basis weight at a flap 18 of an envelope 15 in a case where the recording medium 9 is judged to be the envelope 15, a method for detecting a basis weight by the basis weight detection sensor 50 is not necessary to be set to the second method, and it is only required to detect the basis weight by adopting the first method as in a case where the recording medium 9 is a sheet. Therefore, time required to switch a method for detection by the basis weight detection sensor 50 can be saved, and therefore efficient processing can be achieved.

The present embodiment exemplifies a case where the determination unit 83 determines a plurality of control parameters including velocity of delivery by the fixing rollers 35 and 36 that fix an image onto a recording medium 9, whether or not a loop of the recording medium 9 is formed between a position where an image is transferred onto the recording medium 9 and the fixing rollers 35 and 36, fixing temperature by the fixing roller 35, and pressure contact force by the fixing roller 36, on the basis of a judgment result from the envelope judgment unit 81 and a basis weight acquired by the basis weight acquisition unit 82. However, not limited to this, the determination unit 83 is only required to determine at least one of the above-described plurality of control parameters.

The present embodiment exemplifies a case where the basis weight detection sensor 50 includes a light transmissive sensor and a light reflective sensor. However, it is possible to detect a basis weight of a recording medium 9 by using either the light transmissive sensor alone or the light reflective sensor alone. Therefore, the basis weight detection sensor 50 is not necessarily limited to a basis weight detection sensor including both the light transmitting type sensor and the light reflective sensor, and may include either the light transmissive sensor alone or the light reflective sensor alone.

Second Embodiment

Next, a second embodiment of the present invention will be described. The above-described first embodiment exemplifies a case where the envelope judgment unit 81 judges whether or not a recording medium 9 is an envelope 15 on the basis of a detection result from the envelope detection sensor 40, and the basis weight acquisition unit 82 acquires a basis weight detected by the basis weight detection sensor 50. Meanwhile, in the present embodiment, there will be described an aspect in which a user inputs information about a type of a recording medium 9 or a basis weight of the recording medium 9 to an operation panel 7. Note that a configuration of an image formation apparatus 1 according to the present embodiment is similar to the configuration of the image formation apparatus 1 described in the first embodiment.

In the present embodiment, an envelope judgment unit 81 and a basis weight acquisition unit 82 function in a controller 8 before the image formation apparatus 1 starts a print job. That is, each of the envelope judgment unit 81 and basis weight acquisition unit 82 functions while the user operates the operation panel 7 to perform a setting operation related to the print job. Then, on the operation panel 7, the controller 8 displays an operation screen on which the user can input a type of a recording medium 9 or a basis weight of the recording medium 9.

FIGS. 12A to 12C are diagrams showing operation screens displayed in a display unit 7a of the operation panel 7. FIG. 12A shows a screen G1 for selecting a type of a recording medium 9. For example, the envelope judgment unit 81 displays the screen G1 shown in FIG. 12A in the display unit 7a of the operation panel 7, and receives operation by the user. In the screen G1, a plurality of buttons B1, B2, B3, and B4 corresponding to a type of a recording medium 9 is displayed. While performing setting operation of a print job with respect to the operation panel 7, the user selects one button from among the plurality of buttons B1 to B4 for operation when the screen G1 is displayed. Thus, the user can designate a type of the recording medium 9 with respect to the image formation apparatus 1. FIG. 12A exemplifies a case where the button B4 for envelope is selected by the user.

The envelope judgment unit 81 according to the present embodiment receives selection operation by the user with respect to the screen G1 as described above. Then, in a case where the user selects the button B4 for envelope on the screen G1, the envelope judgment unit 81 judges that the recording medium 9 is an envelope. Therefore, in the present embodiment, it is possible to identify whether or not a recording medium 9 is an envelope before a print job is started in the image formation apparatus 1.

FIG. 12B shows a screen G2 that is displayed when the user selects an envelope. The screen G2 is a screen for inputting a basis weight of an envelope. The screen G2 is provided with a basis weight display field R1 for displaying a basis weight of the envelope, and a button group B5 for a user to input a numerical value is displayed at a position below the basis weight display field R1. When selecting an envelope as the recording medium 9, the user can manually input a basis weight of the envelope used for image formation by operating the screen G2.

The basis weight acquisition unit 82 according to the present embodiment receives operation by the user with respect to the screen G2 as described above. Then, the basis weight acquisition unit 82 acquires the basis weight input to the screen G2 by the user as the basis weight of the envelope used for image formation. Therefore, in the present embodiment, it is also possible to acquire a basis weight of an envelope before a print job is started in the image formation apparatus 1.

However, it may be difficult for the user to grasp a basis weight of the envelope used as the recording medium 9. Therefore, the controller 8 may display a screen G3 as shown in FIG. 12C on the display unit 7*a* instead of the screen G2 in FIG. 12B. The screen G3 shown in FIG. 12C is a screen for displaying in a list format of a plurality of types of envelope images (thumbnail images) B7, B8, B9, and B10 registered in advance in the image formation apparatus 1 Each of the envelope images B7 to B10 includes a function as a button with which the user can perform selection operation. Therefore, even in a case where the user does not know the basis weight of the envelope used for image formation, the user can identify and select the envelope used for the image formation from the plurality of envelope images B7 to B10 displayed in the screen G3. For example, a memory 71 of the controller 8 stores envelope information including envelope images and corresponding envelope basis weights, the envelope information being registered in the image formation apparatus 1 in advance. Then, when the user selects one envelope image, the basis weight corresponding to the envelope image can be acquired. That is, the basis weight acquisition unit 82 acquires a basis weight of an envelope used for image formation by receiving operation on the screen G3 by the user and referring to envelope information on the basis of the envelope image selected by the user. In this case as well, it is possible to acquire a basis weight of an envelope before a print job is started in the image formation apparatus 1.

As described above, the image formation apparatus 1 according to the present embodiment can judge whether or not a recording medium 9 is an envelope on the basis of information input by a user before starting a print job, and, if the recording medium 9 is an envelope, can acquire a basis weight of the envelope. Therefore, with the image formation apparatus 1, various control parameters corresponding to basis weights of envelopes can be set by default for a print job executed on the basis of an instruction from the user.

Therefore, it is not necessary to change system velocity Vs, or the like, after starting delivery operation of an envelope as a recording medium 9.

Further, in a case where a recording medium 9 is an envelope, the image formation apparatus 1 according to the present embodiment can perform image formation corresponding to a basis weight of the envelope as in the first embodiment. Therefore, even if the recording medium 9 is a thin envelope, it is possible to perform image formation while reducing wrinkling of the envelope.

The points other than those described above in the present embodiment are similar to the points described in the first embodiment. For example, as described in the first embodiment, the image formation apparatus 1 may have a configuration in which an envelope detection sensor 40 and a basis weight detection sensor 50 are disposed along a delivery path 33 for a recording medium 9. Therefore, in a case where the user does not designate a type of a recording medium 9 or does not designate a basis weight of an envelope before executing a print job, the image formation apparatus 1 performs operation described in the first embodiment. Thus, even if the recording medium 9 is an envelope, the image formation apparatus 1 can perform appropriate image forming operation corresponding to a basis weight of the envelope.

Further, the image formation apparatus 1 according to the present embodiment may not include an envelope detection sensor 40 and a basis weight detection sensor 50.

Third Embodiment

Next, a third embodiment of the present invention will be described. In the present embodiment, there will be described an aspect in which an image formation apparatus 1 acquires information about a recording medium 9 and a basis weight thereof from an external apparatus. Note that a configuration of an image formation apparatus 1 according to the present embodiment is similar to the configuration of the image formation apparatus 1 described in the first embodiment.

Figure 13:
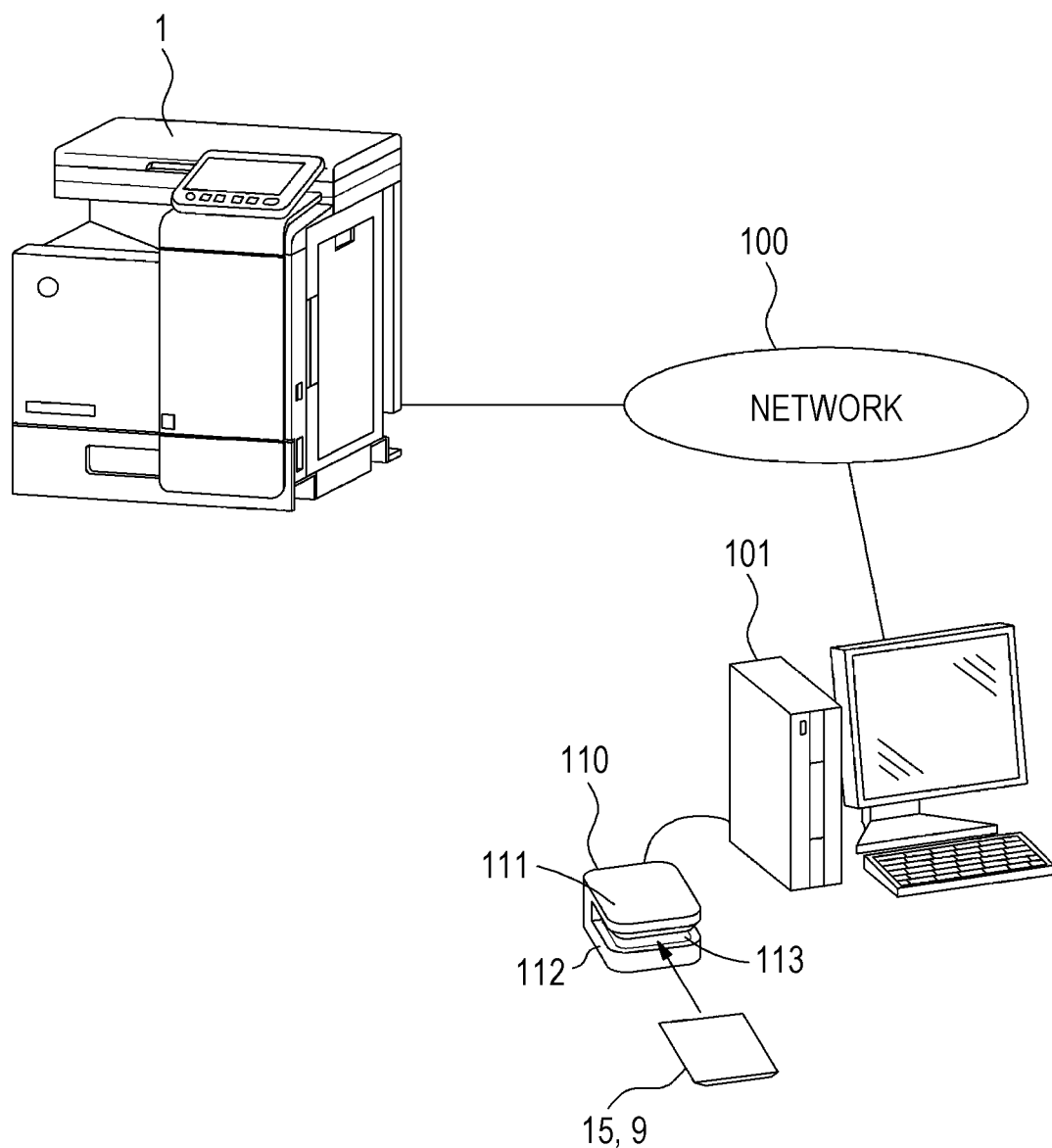
FIG. 13 is a diagram showing a configuration example of an image formation apparatus according to a third embodiment.

FIG. 13 is a diagram showing a configuration example of the image formation apparatus 1 according to the third embodiment. The image formation apparatus 1 is connected to an external information processing apparatus 101 via a network 100 such as a LAN. The information processing apparatus 101 includes, for example, a personal computer (PC) or the like, and can communicate with the image formation apparatus 1 via the network 100. In the present embodiment, an image formation system is constructed by the image formation apparatus 1 and the information processing apparatus 101. The image formation system may include an apparatus other than the image formation apparatus 1 and the information processing apparatus 101.

The information processing apparatus 101 includes a recording medium measurement apparatus 110. The recording medium measurement apparatus 110 has a substantially U-shaped outer shape in which an upper housing 111 and a lower housing 112 are disposed so as to face each other at a predetermined distance in a vertical direction. A gap between the upper housing 111 and the lower housing 112 is an insertion space 113 into which a recording medium 9 can be inserted. The upper housing 111 and the lower housing 112 have configurations similar to the configurations of the envelope detection sensor 40 and the basis weight detection sensor 50 described in the first embodiment. That is, there is described in the first embodiment an example in which the envelope detection sensor 40 and the basis weight detection sensor 50 are disposed so as to sandwich a delivery path 33 for a recording medium 9. Meanwhile, in the present embodiment, each of an envelope detection sensor 40 and a basis weight detection sensor 50 is disposed so as to sandwich the insertion space 113. Therefore, by causing the envelope detection sensor 40 and the basis weight detection sensor 50 to operate with a recording medium 9 inserted in the insertion space 113, the recording medium measurement apparatus 110 can detect whether or not the recording medium 9 is an envelope, and also can detect a basis weight of the recording medium 9.

When a user gives an instruction on start of detection by operating the information processing apparatus 101 with a recording medium 9 to be used in the image formation apparatus 1 inserted in the insertion space 113 of the recording medium measurement apparatus 110, measurement operation of a recording medium 9 starts in the recording medium measurement apparatus 110. That is, the recording medium measurement apparatus 110 starts operation to detect whether or not the recording medium 9 inserted in the insertion space 113 is an envelope and detect a basis weight of the recording medium 9. When the measurement operation is completed, the recording medium measurement apparatus 110 outputs, to the information processing apparatus 101, a detection result of whether or not the recording medium 9 is an envelope and the basis weight of the recording medium 9.

When the information processing apparatus 101 receives the detection result of whether or not the recording medium 9 is an envelope and the basis weight of the recording medium 9 from the recording medium measurement apparatus 110, the information processing apparatus 101 generates information about the recording medium 9 on the basis of the information. At this time, if it is detected that the recording medium 9 is an envelope, the information processing apparatus 101 converts the basis weight of the recording medium 9 into a basis weight of an envelope. Then, the information processing apparatus 101 transmits information about the recording medium 9 to the image formation apparatus 1.

When receiving the information about the recording medium 9 via a communication unit 72, the image formation apparatus 1 saves the information in the memory 71 as information about the recording medium 9 newly set in a paper feed tray 3 or a manual feed tray 4. Therefore, the image formation apparatus 1 can register the information about the recording medium 9 before starting a print job.

Further, the recording medium measurement apparatus 110 may not have an envelope detection sensor 40 built in. In this case, the information processing apparatus 101 can grasp that a recording medium 9 is an envelope by receiving envelope designation operation by the user, and can convert a basis weight of the recording medium 9 into a basis weight of the envelope.

Therefore, an envelope judgment unit 81 according to the present embodiment can judge whether or not the recording medium 9 is an envelope on the basis of information about the recording medium 9, the information being received from outside via the communication unit 72. The basis weight acquisition unit 82 according to the present embodiment can acquire a basis weight of the recording medium 9 on the basis of the information about the recording medium 9, the information being received from outside via the communication unit 72. Therefore, in a case where a recording medium 9 is an envelope, the image formation apparatus 1 can perform image formation corresponding to a basis weight of the envelope as in the second embodiment.

Therefore, even if the recording medium 9 is a thin envelope, it is possible to perform image formation while reducing wrinkling of the envelope.

The above description exemplifies the aspect in which the recording medium measurement apparatus 110 transmits information about a recording medium 9 to the image formation apparatus 1 via the information processing apparatus 101. However, not limited to this, in a case where the recording medium measurement apparatus 110 can directly communicate with the image formation apparatus 1, a configuration may be employed in which the recording medium measurement apparatus 110 directly transmits information about a recording medium 9 to the image formation apparatus 1 without using an information processing apparatus 101.

The points other than those described above in the present embodiment are similar to the points described in the first embodiment. For example, as described in the first embodiment, the image formation apparatus 1 may have a configuration in which an envelope detection sensor 40 and a basis weight detection sensor 50 are disposed along a delivery path 33 for a recording medium 9. Therefore, in a case where information about a recording medium 9 is not saved in the memory 71 before a print job, the image formation apparatus 1 performs operation described in the first embodiment. Thus, even if the recording medium 9 is an envelope, the image formation apparatus 1 can perform appropriate image forming operation corresponding to a basis weight of the envelope.

Further, the image formation apparatus 1 according to the present embodiment may not include an envelope detection sensor 40 and a basis weight detection sensor 50.

(Modifications)

Although embodiments of the present invention have been described and illustrated in detail, the disclosed embodiments are made for purposes of illustration and example only and not limitation. The scope of the present invention should be interpreted by terms of the appended claims, and various modifications can be applied.

For example, the above embodiments exemplify a case where an image formation apparatus 1 is formed as an MFP. However, the image formation apparatus 1 is not limited to an image formation apparatus formed as an MFP. That is, the image formation apparatus 1 may be a printer including a printing function exclusively.

Further, the above embodiments exemplify a case where a program 78 executed by a controller 8 of an image formation apparatus 1 is stored in a memory 71 in advance. However, the program 78 may be installed or updated in the image formation apparatus 1 by being downloading from outside via a communication unit 72. In this case, the program 78 is provided so as to be downloadable on the image formation apparatus 1 via a network. Further, the program 78 may be provided recorded on a computer-readable recording medium such as a CD-ROM or a USB memory.

What is claimed is:

1. An image formation apparatus comprising:
   an image former that forms an image on a recording medium delivered along a predetermined delivery path and outputs the recording medium;
   a first hardware processor that judges whether or not the recording medium is an envelope;
   a second hardware processor that acquires a basis weight of the recording medium;
   a third hardware processor that determines control for when an image is formed on the recording medium on the basis of a judgment result from the first hardware processor and a basis weight acquired by the second hardware processor; and a fourth hardware processor that controls operation of the image former on the basis of a determination result from the third hardware processor.

2. The image formation apparatus according to claim 1, wherein, in a case where the first hardware processor has judged the recording medium to be an envelope, the third hardware processor selects a first control parameter when a basis weight of an envelope is equal to or more than a predetermined value, and selects a second control parameter different from the first control parameter when the basis weight of the envelope is less than the predetermined value, the basis weight of the envelope being acquired by the second hardware processor.

3. The image formation apparatus according to claim 1, further comprising a basis weight detector that is provided, on the delivery path, upstream of a position where an image is formed by the image former, and that detects a basis weight of the recording medium delivered along the delivery path,
wherein the second hardware processor acquires a basis weight detected by the basis weight detector.

4. The image formation apparatus according to claim 3, wherein the second hardware processor sets a basis weight detection method by the basis weight detector to a first method in a case where the first hardware processor judges the recording medium not to be an envelope, and sets a basis weight detection method by the basis weight detector to a second method in a case where the first hardware processor judges the recording medium to be an envelope, the second method being different from the first method.

5. The image formation apparatus according to claim 3, wherein the basis weight detector includes at least one of a light transmissive sensor or a light reflective sensor.

6. The image formation apparatus according to claim 5, wherein, in a case where the recording medium is judged to be an envelope by the first hardware processor, the basis weight detector increases an amount of light or sensitivity of the light transmissive sensor or light reflective sensor as compared to a case where the recording medium is judged not to be an envelope.

7. The image formation apparatus according to claim 3, wherein, in a case where the recording medium is judged to be an envelope by the first hardware processor, the second hardware processor causes the basis weight detector to detect a basis weight of the recording medium.

8. The image formation apparatus according to claim 3, wherein, in a case where the recording medium is judged to be an envelope by the first hardware processor, the second hardware processor causes the basis weight detector to detect a basis weight at a flap of the envelope.

9. The image formation apparatus according to claim 8, further comprising a flap detector provided, on the delivery path, more upstream than the basis weight detector,
wherein the second hardware processor causes the basis weight detector to detect a basis weight along with the flap detector detecting a flap of an envelope.

10. The image formation apparatus according to claim 3, wherein, in a case where the recording medium is judged to be an envelope by the first hardware processor, the second hardware processor causes the basis weight detector to detect a basis weight at a part where sheets overlap, the part being other than a flap of the envelope.

11. The image formation apparatus according to claim 1, wherein the second hardware processor receives basis weight input operation by a user and acquires the basis weight input, by the user, as a basis weight of the recording medium.

12. The image formation apparatus according to claim 1, wherein the first hardware processor receives selection operation, by a user, of whether or not the recording medium is an envelope, and judges the recording medium to be an envelope in a case where the user selects that the recording medium is an envelope.

13. The image formation apparatus according to claim 1, further comprising an envelope detector that is provided, on the delivery path, upstream of a position where an image is formed by the image former, and that detects the recording medium delivered along the delivery path to be an envelope,
wherein the first hardware processor judges the recording medium to be an envelope by the envelope detector detecting that the recording medium is an envelope.

14. The image formation apparatus according to claim 13, wherein the envelope detector includes an ultrasonic sensor.

15. The image formation apparatus according to claim 1, wherein the third hardware processor determines a control parameter for at least one of velocity of delivery by a fixing roller that fixes an image onto the recording medium, whether or not a loop of the recording medium is formed between a position where an image is transferred onto the recording medium and the fixing roller, fixing temperature by the fixing roller, or pressure contact force by the fixing roller.

16. The image formation apparatus according to claim 1, wherein, in a case where the recording medium is judged to be an envelope by the first hardware processor, the third hardware processor changes velocity of delivery by a fixing roller that fixes an image onto the recording medium according to a basis weight of an envelope acquired by the second hardware processor.

17. The image formation apparatus according to claim 16, wherein, in a case where a basis weight of an envelope acquired by the second hardware processor is less than a predetermined value, the third hardware processor sets velocity of delivery by the fixing roller to higher than normal delivery velocity.

18. The image formation apparatus according to claim 15, wherein, in a case where the recording medium is judged to be an envelope by the first hardware processor, the third hardware processor determines to perform control not to form a loop of the recording medium between the position where an image is transferred onto the recording medium and the fixing roller when a basis weight of an envelope acquired by the second hardware processor is less than a predetermined value.

19. The image formation apparatus according to claim 15, wherein, in a case where the recording medium is judged to be an envelope by the first hardware processor, the third hardware processor changes fixing temperature of the fixing roller according to a basis weight of an envelope acquired by the second hardware processor.

20. The image formation apparatus according to claim 19, wherein, in a case where a basis weight of an envelope acquired by the second hardware processor is less than a predetermined value, the third hardware processor sets fixing temperature of the fixing roller to higher than normal fixing temperature.

21. The image formation apparatus according to claim 15, wherein, in a case where the recording medium is judged to be an envelope by the first hardware processor, the third hardware processor changes pressure contact force of the fixing roller according to a basis weight of an envelope acquired by the second hardware processor.

22. The image formation apparatus according to claim 21, wherein, in a case where a basis weight of an envelope acquired by the second hardware processor is less than a predetermined value, the third hardware processor sets pressure contact force of the fixing roller to weaker than normal pressure contact force.

23. The image formation apparatus according to claim 1, further comprising a communicator that communicates with an external apparatus,
wherein the second hardware processor is able to acquire a basis weight of the recording medium from the external apparatus via the communicator.

24. The image formation apparatus according to claim 23, wherein the first hardware processor is able to judge the recording medium to be an envelope in a case where the external apparatus designates that the recording medium is an envelope via the communicator.

25. A method for controlling an image formation apparatus including an image former that forms an image on a recording medium delivered along a predetermined delivery path and outputs the recording medium, the control method comprising:
judging whether or not the recording medium is an envelope;
acquiring a basis weight of the recording medium;
determining control for when an image is formed on the recording medium on the basis of a judgment result from the judging and a basis weight acquired by the acquiring; and
controlling operation of the image former on the basis of a determination result from the determining.

* * * * *